(12) United States Patent
Snyder et al.

(10) Patent No.: US 12,386,655 B2
(45) Date of Patent: Aug. 12, 2025

(54) EVENT-BASED VIEW SYNCHRONIZATION SYSTEMS AND METHODS

(71) Applicant: Improbable Worlds Limited, London (GB)

(72) Inventors: Samuel James Henry Snyder, Cambridge (GB); Fabian Andreas Hahn, St. Albans (GB)

(73) Assignee: Improbable Worlds Limited, London (GB)

( * ) Notice: Subject to any disclaimer, the term of this patent is extended or adjusted under 35 U.S.C. 154(b) by 1043 days.

(21) Appl. No.: 17/206,242

(22) Filed: Mar. 19, 2021

(65) Prior Publication Data

US 2022/0300675 A1 Sep. 22, 2022

(51) Int. Cl.
| | |
|---|---|
| *G06F 30/20* | (2020.01) |
| *G06F 9/48* | (2006.01) |
| *G06F 9/50* | (2006.01) |
| *G06F 16/23* | (2019.01) |

(52) U.S. Cl.
CPC .......... *G06F 9/4881* (2013.01); *G06F 9/5005* (2013.01); *G06F 16/2308* (2019.01); *G06F 16/2358* (2019.01)

(58) Field of Classification Search
CPC .. G06F 9/4881; G06F 9/5005; G06F 16/2308; G06F 16/2358
USPC .......................................................... 703/13
See application file for complete search history.

(56) References Cited

U.S. PATENT DOCUMENTS

| | | | | |
|---|---|---|---|---|
| 8,751,629 | B2 * | 6/2014 | White | H04L 63/1433 709/224 |
| 10,025,892 | B2 | 7/2018 | Whitehead et al. | |
| 2017/0300657 | A1 * | 10/2017 | Barrett | G16H 50/50 |
| 2018/0068040 | A1 * | 3/2018 | Lewis | G06F 9/5061 |
| 2018/0341728 | A1 * | 11/2018 | Micou | G06F 9/5083 |
| 2018/0349528 | A1 * | 12/2018 | Strnisa | G06F 21/6227 |
| 2019/0018915 | A1 * | 1/2019 | Harkness | G06F 16/288 |

FOREIGN PATENT DOCUMENTS

WO 2020058708 A1 3/2020

OTHER PUBLICATIONS

May 18, 2022—(WO) International Search Report and Written Opinion—App PCT/GB2022/050610.

* cited by examiner

*Primary Examiner* — Andre Pierre Louis
(74) *Attorney, Agent, or Firm* — Banner & Witcoff, Ltd.

(57) ABSTRACT

Methods, systems, computer-readable media, and apparatuses for performing, providing, managing, executing, and/or running a simulation are presented. In one or more embodiments, a computing device may receive one or more changes associated with one of a plurality of entities being simulated. The computing device may determine, based on the one or more changes, one or more component updates associated with the one of the plurality of entities, and determine one or more authority change events occurred on one or more components of the one of the plurality of entities. The computing device may further determine that one or more interest query change events occurred and that one or more interest view change events occurred. The computing device may further determine one or more worker protocol operations, and synchronize, based on the one or more worker protocol operations, view changes with one or more interested workers.

20 Claims, 13 Drawing Sheets

EVENT-BASED VIEW SYNCHRONIZATION SYSTEMS AND METHODS

FIELD

Aspects described herein generally relate to computers, networking, hardware, and software. More specifically, some aspects described herein relate to a networked system architecture for controlling and managing scalable computer-based simulations.

BACKGROUND

Virtual simulations provide an immersive experience and a shared view of a simulated world for each participating user. To maintain and manage the shared view, simulation systems may rely on a distributed cluster of servers that each connects to a management server for managing and synchronizing each user's view. As a result, there may be two distributed clusters of machines that perform the simulation of the world. However, this may consume a large amount of resources and may not be as efficient as a single distributed cluster of machines managed by a single server. For example, data latency and data throughput of the simulation system may not be ideal for a complex simulation game.

These and other problems are addressed herein.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to a simulation development environment. Other aspects described herein are directed to an event-based view synchronization system. Yet other aspects described herein are directed to a tick-stage based simulation system. Yet other aspects described herein are directed to subscription matching of a simulation system.

In accordance with one or more aspects, there is provided a simulation system having at least one computer processor controlling some operations of the system; and memory storing computer-readable instructions that, when executed by the at least one computer processor, configure the system to run a simulation. The simulation may comprise a plurality of entities being simulated and a plurality of worker modules. Each entity of the plurality of entities may comprise one or more components. Each of the plurality of worker modules may configured to perform a subset of the simulation, and each worker module of the plurality of worker modules may be configured to instantiate a subset of the plurality of entities.

The simulation system may further comprise a state synchronization module configured to receive one or more changes associated with one of the plurality of entities, and determine, based on the one or more changes, one or more component updates associated with the one of the plurality of entities.

The simulation system may further comprise an authority assignment module configured to receive the one or more changes and the one or more component updates, and determine, based on the one or more changes and the one or more component updates, that one or more authority change events occurred on one or more components of the one of the plurality of entities.

The simulation system may further comprise an interest management module configured to receive, one or more changes, the one or more component updates, and the one or more authority change events, and determine, based on the one or more changes, the one or more component updates, and the one or more authority change events, that one or more interest query change events occurred.

The simulation system may further comprise a subscription matching module configured to receive, the one or more changes, the one or more component updates, and the one or more interest query change events, and determine, based on the one or more changes, the one or more component updates, and the one or more interest query change events, that one or more interest view change events occurred.

The simulation system may further comprise a view synchronization module configured to receive, the one or more component updates, the one or more authority change events, and the one or more interest view change events, and determine, based on the one or more component updates, the one or more authority change events, and the one or more interest view change events, one or more worker protocol operations to synchronize view changes with one or more interested worker modules of the plurality of worker modules.

In accordance with one or more aspects, there is provided a method. In the method, a computing device may receive one or more changes associated with one of a plurality of entities being simulated. Each entity of the plurality of entities may comprise one or more components. The computing device may determine, based on the one or more changes, one or more component updates associated with the one of the plurality of entities. The computing device may determine, based on the one or more changes and the one or more component updates, that one or more authority change events occurred on one or more components of the one of the plurality of entities. The computing device may further determine, based on the one or more changes, the one or more component updates, and the one or more authority change events, that one or more interest query change events occurred. The computing device may further determine, based on the one or more changes, the one or more component updates, and the one or more interest query change events, that one or more interest view change events occurred. The computing device may determine, based on the one or more component updates, the one or more authority change events, and the one or more interest view change events, one or more worker protocol operations. In addition, the computing device may synchronize, based on the one or more worker protocol operations, view changes with one or more interested workers of a plurality of workers. Each of the plurality of workers is configured to instantiate a subset of the plurality of entities.

Apparatuses and non-transitory computer readable media may be configured to provide and/or support various aspects described herein. These and additional aspects will be appreciated with the benefit of the disclosures discussed in further detail below.

It should be noted that any one or more of the above-described features may be used with any other feature or aspect in isolation or any combination. Features from one embodiment or aspect may be interchanged or used together with one or more features of any other described embodiment or aspect.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. Additionally, the phraseology and terminology used herein are for the purpose of description and should not be regarded as limiting. Rather, the phrases and terms used herein are to be given their broadest interpretation and meaning.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. Particular data structures may be used to more effectively implement one or more aspects described herein, and such data structures are contemplated within the scope of computer executable instructions and computer-usable data described herein. In addition, various signals representing data or events as described herein may be transferred between a source and a destination in the form of electromagnetic waves traveling through signal-conducting media such as metal wires, optical fibers, and/or wireless transmission media (e.g., air and/or space).

As a general introduction to the subject matter described in more detail below, aspects described herein are directed towards systems, methods, apparatuses and techniques for providing a simulation development environment based on a single machine. Other aspects described herein are directed to a tick-stage based simulation system. Yet other aspects described herein are directed to an event-based view synchronization system. Yet other aspects described herein are directed to subscription matching associated with a simulation system.

Figure 1:
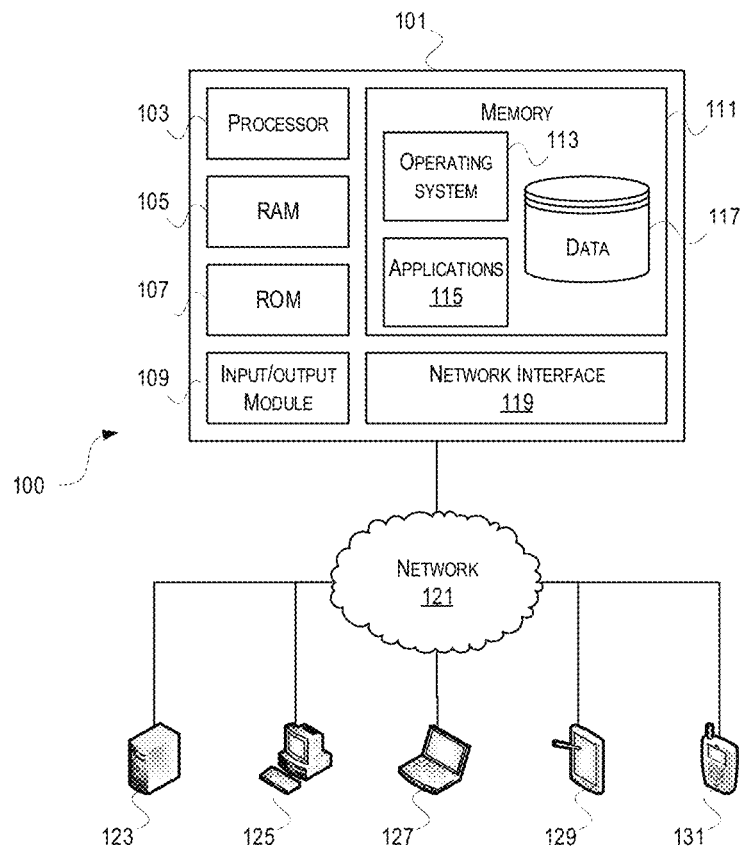
FIG. 1 depicts an illustrative computer system architecture that may be used in accordance with one or more illustrative aspects described herein.

Computer software, hardware, and networks may be utilized in a variety of different system environments, including standalone, networked, virtualized, and/or cloud-based environments, among others. FIG. 1 illustrates one example of a block diagram of a simulation computing device (or system) 101 in a simulation computing system 100 (e.g., a spatially-optimized simulation computing system) that may be used according to one or more illustrative embodiments of the disclosure. The simulation computing device 101 may comprise a processor 103 for controlling overall operation of the simulation computing device 101 and its associated components, including RAM 105, ROM 107, input/output module 109, and memory 111. The simulation computing device 101, along with one or more additional computing devices (e.g., network nodes 123, 125, 127, 129, and 131) may correspond to any one of multiple systems or devices described herein, such as personal mobile devices, client computing devices, proprietary simulation systems, additional external servers and other various devices in the simulation computing system 100. These various computing systems may be configured individually or in combination, as described herein, for providing the simulation computing system 100. Those of skill in the art will appreciate that the functionality of simulation computing device 101 (or network nodes 123, 125, 127, 129, and 131) as described herein may be spread across multiple processing devices, for example, to distribute processing load across multiple computers, to segregate transactions based on processor load, location within a simulated world, user access level, quality of service (QoS), and the like.

The various network nodes 123, 125, 127, 129, and 131 may be interconnected via a network 121, such as the Internet. Other networks may also or alternatively be used, including private intranets, corporate networks, local area networks (LAN), wide area networks (WAN), metropolitan area networks (MAN), wireless networks, personal networks (PAN), and the like. Network 121 is for illustration purposes and may be replaced with fewer or additional computer networks. Network 121 may have one or more of any known network topology and may use one or more of a variety of different protocols, such as Ethernet. Devices 123, 125, 127, 129, 131, and other devices (not shown) may be connected to one or more of the networks via twisted pair wires, coaxial cable, fiber optics, radio waves, or other communication media.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices in simulation system components described herein may be configured to communicate using any of these network protocols or technologies.

The term "network" as used herein and depicted in the drawings refers not only to systems in which remote computing devices are coupled together via one or more communication paths, but also to stand-alone devices that may be coupled, from time to time, to such systems that have storage capability. Consequently, the term "network" includes not only a "physical network" but also a "content network," which is comprised of the data which resides across all physical networks.

The Input/Output (I/O) module 109 may include a microphone, keypad, touch screen, game controller, joystick, and/or stylus through which a user of the simulation computing device 101 may provide input, and may also include one or more of a speaker for providing audio output and a video display device for providing textual, audiovisual and/or graphical output. Software may be stored within memory 111 and/or storage to provide instructions to the processor 103 for enabling the simulation computing device 101 to perform various actions. For example, the memory 111 may store software used by the simulation computing device 101, such as an operating system 113, application programs 115, and an associated internal database 117. The database 117 may include a second database (e.g., as a separate table, report). That is, the information may be stored in a single database, or separated into different logical, virtual, or physical databases, depending on system design. The various hardware memory units in the memory 111 may include volatile and nonvolatile, removable and non-removable media implemented in any method or technology for storage of information such as computer-readable instructions, data structures, program modules, or other data. The simulation computing device 101 and/or the computing devices 127, 129, 131 may also be mobile terminals (e.g., mobile phones, smartphones, personal digital assistants (PDAs), notebooks) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, vehicle-based computing devices, multiprocessor systems, microprocessor-based systems, programmable consumer electronics, network personal computers (PCs), minicomputers, mainframe computers, distributed computing environments that include any of the above systems or devices, and the like.

Figure 2:
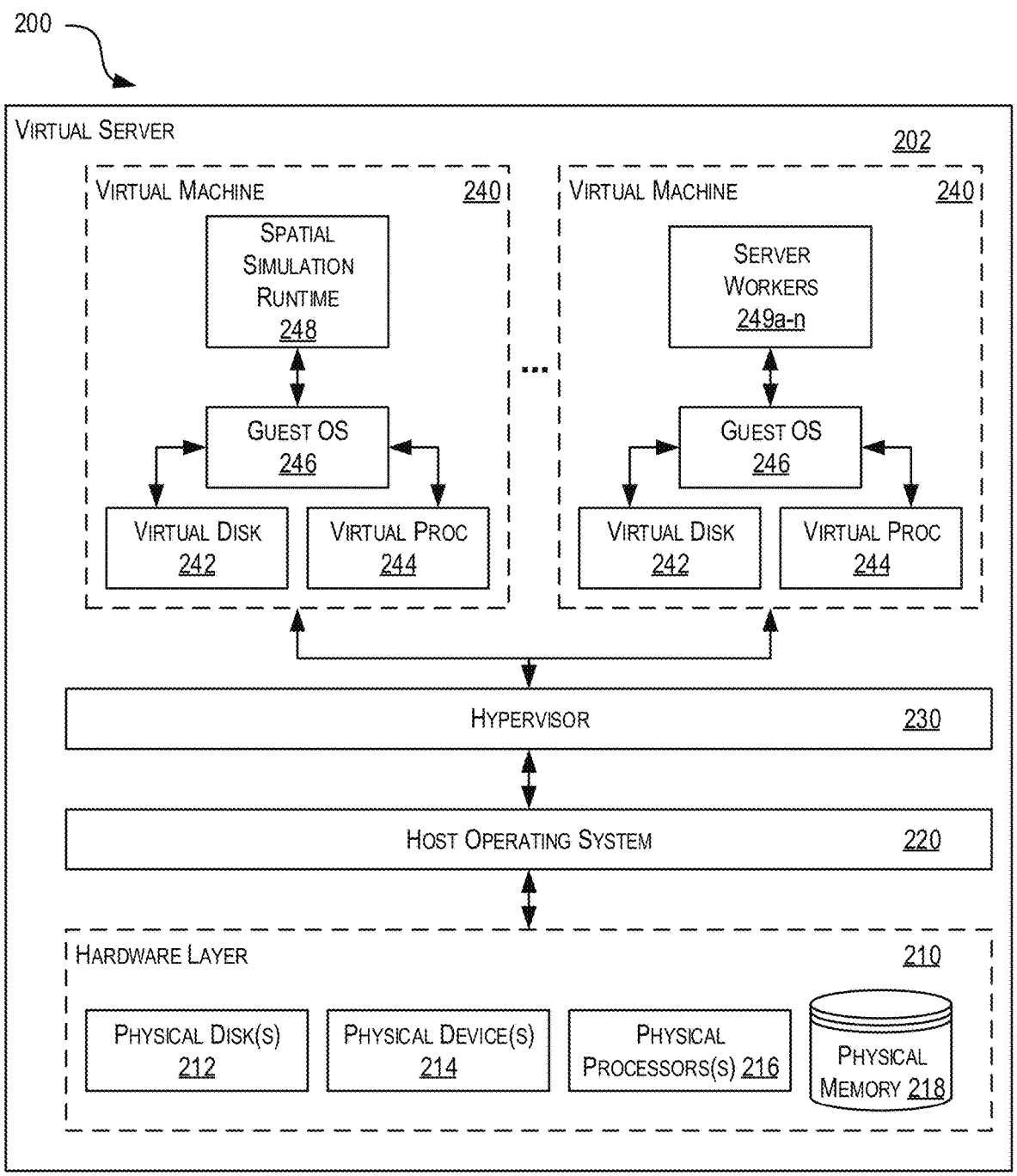
FIG. 2 depicts an illustrative virtualized (hypervisor) system architecture that may be used in accordance with one or more illustrative aspects described herein.

FIG. 2 shows a high-level architecture of an illustrative simulation system. The simulation system 200 may be a single server system, including at least one virtual server 202 which may be configured to provide simulation functionality to the simulation system 200 and/or may provide access to the simulation system 200 to one or more client computing devices (e.g., computing devices 123, 125, 127, 129, 131). In some examples, the simulation system 200 may be a multi-server system or a cloud-based system. The simulation system 200 may be a computation platform that enables the creation of complex simulations and virtual worlds. The virtual server 202 may comprise one or more virtual machines 240. One of the virtual machines 240 may comprise an instance of a spatial simulation runtime 248 for instantiating, managing, and monitoring one or more instances of server worker processes 249a-249n (generally referred to herein as "worker(s) 249."). The workers 249 may run on one or more different virtual machines 240, so that the workers might not compete for resources between each other and with the spatial simulation runtime 248, which may lead to a higher scale in the overall simulation setup. Alternatively, the spatial simulation runtime 248 and the workers 249 may run on the same virtual machine 240. In an example, the workers 249 may be game engines. As described in further detail below, the spatial simulation runtime 248 may be configured to serve as a router for component data expressed in the simulation system 200 schema, and/or serve as a query-based interest and authority computation and resolution system that dynamically updates a routing table and clients' views.

The virtual server 202 illustrated in FIG. 2 may be deployed as and/or implemented by one or more embodiments of the simulation computing device 101 illustrated in FIG. 1 or by other known computing devices. The virtual server 202 may comprise a hardware layer 210 with one or more hardware elements that communicate with the virtual server 202. Optionally, the hardware layer 210 may comprise one or more physical disks 212, one or more physical devices 214, one more physical processors 216, and one or more physical memories 218. Physical components 212, 214, 216, and 218 may include, for example, any of the components described above with respect to the spatial simulation computing device 101. In one example, physical devices 214 may include a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router), or any device connected to or communicating with the virtual server 202. Physical memory 218 may include any type of memory. In another example, the physical memory 218 may store data, and may store one or more programs, or set of executable instructions. Programs or executable instructions stored in the physical memory 218 may be executed by the one or more processors 216 of the virtual server 202. The virtual server 202 may further comprise a host operating system 220 which may be stored in a memory element in the physical memory 218 and may be executed by one or more of the physical processors 216.

A hypervisor 230 may provide virtual resources to an operating system 246 or to the workers 249 executing on the virtual machine 240 in any manner that simulates the operating system 246 or the workers 249 having direct access to system resources. System resources may include, but are not limited to, the physical disks 212, the physical devices 214, the physical processors 216, the physical memory 218, and any other component included in hardware layer 210. The hypervisor 230 may be used to emulate virtual hardware, partition physical hardware, virtualize physical hardware, and/or execute virtual machines that provide computing resources to the spatial simulation runtime 248 and the workers 249. The hypervisor 230 may control processor scheduling and memory partitioning for the virtual machine 240 executing on the virtual server 202.

The hypervisor 230 may be Type 2 hypervisor, where the hypervisor may execute within a host operating system 220 executing on the virtual server 202. The virtual machine 240 may then execute at a level above the hypervisor 230. The Type 2 hypervisor may execute within the context of the host operating system 220 such that the Type 2 hypervisor interacts with the host operating system 220. One or more virtual server 202 in a spatial simulation system 200 may instead include a Type 1 hypervisor (not shown). A Type 1 hypervisor may execute on the virtual server 202 by directly accessing the hardware and resources within the hardware layer 210. That is, while a Type 2 hypervisor 230 may access system resources through the host operating system 220, as shown, a Type 1 hypervisor may directly access all system resources without the host operating system 220. A Type 1 hypervisor 230 may execute directly on one or more physical processors 316 of the virtual server 202, and may include program data stored in the physical memory 318.

The spatial simulation runtime 248 may cause the hypervisor 230 to create one or more virtual machines 240 in which additional spatial simulation runtime 248 and worker 249 instances may execute within the guest operating systems 246. The hypervisor 230 may load a virtual machine image to create the virtual machine 240. The hypervisor 230 may execute the guest operating system 246 within the virtual machine 240. The virtual machine 240 may execute the guest operating system 246.

In addition to creating the virtual machine 240, the hypervisor 230 may control the execution of the virtual machine 240. The hypervisor 230 may present the virtual machine 240 with an abstraction of at least one hardware resource provided by the virtual server 202 (e.g., any hardware resource available within the hardware layer 210). The hypervisor 230 may control the manner in which the virtual machine 240 may access physical processors 216 available in the virtual server 202. Controlling access to physical processors 216 may include determining whether the virtual machine 240 should have access to the processor 216, and how physical processor capabilities are presented to the virtual machine 240.

As shown in FIG. 2, the virtual server 202 may host or execute the virtual machines 240. The virtual machine 240 may be a set of executable instructions that, when executed by the processor 216, imitate the operation of a physical computer such that the virtual machine 240 may execute programs and processes much like a physical computing device. While FIG. 2 illustrates an embodiment where the virtual server 202 host one virtual machine (e.g., the virtual machine 240), in other embodiments virtual server 202 may host any number of virtual machines. The hypervisor 230 may provide the virtual machine 240 with a unique virtual view of the physical hardware, memory, processor, and other system resources available to that virtual machine 240. Optionally, the hypervisor 230 may provide the virtual machine 240 with a substantially similar virtual view of the physical hardware, memory, processor, and other system resources available to the virtual machine 240.

The virtual machine 240 may include a virtual disk 242 and a virtual processor 244. The virtual disk 242 may be a virtualized view of one or more physical disks 212 of the virtual server 202, or may be a portion of one or more physical disks 212 of the virtual server 202. The virtualized view of the physical disks 212 may be generated, provided, and managed by the hypervisor 230. The hypervisor 230 may provide the virtual machine 240 with a unique view of the physical disks 212. Thus, the particular virtual disk 242 included in each virtual machine 240 may be unique when compared with the other virtual disks 240.

The virtual machine 240 may execute, using the virtual processor 244, one or more workers 249a-249n using the guest operating system 246. The guest operating system 246 may be any one of the following non-exhaustive list of operating systems: WINDOWS, UNIX, LINUX, iOS, ANDROID, SYMBIAN. The guest operating system 246 may be a purpose-built operating system based on one or more of the aforementioned operating systems. For example, the guest operating system 246 may consist of a purpose-built version of LINUX which may comprise only the functional modules necessary to support operation of the workers 249. Optionally, and as described in further detail below, the virtual machine 240 may execute one or more bridge modules (not shown) corresponding to the one or more workers 249a-249n executing in the virtual machine 240.

FIG. 2 illustrates just one example of a simulation system that may be used, and those of skill in the art will appreciate that the specific system architecture and computing devices used may vary, and are secondary to the functionality that they provide, as further described herein.

Figure 3:
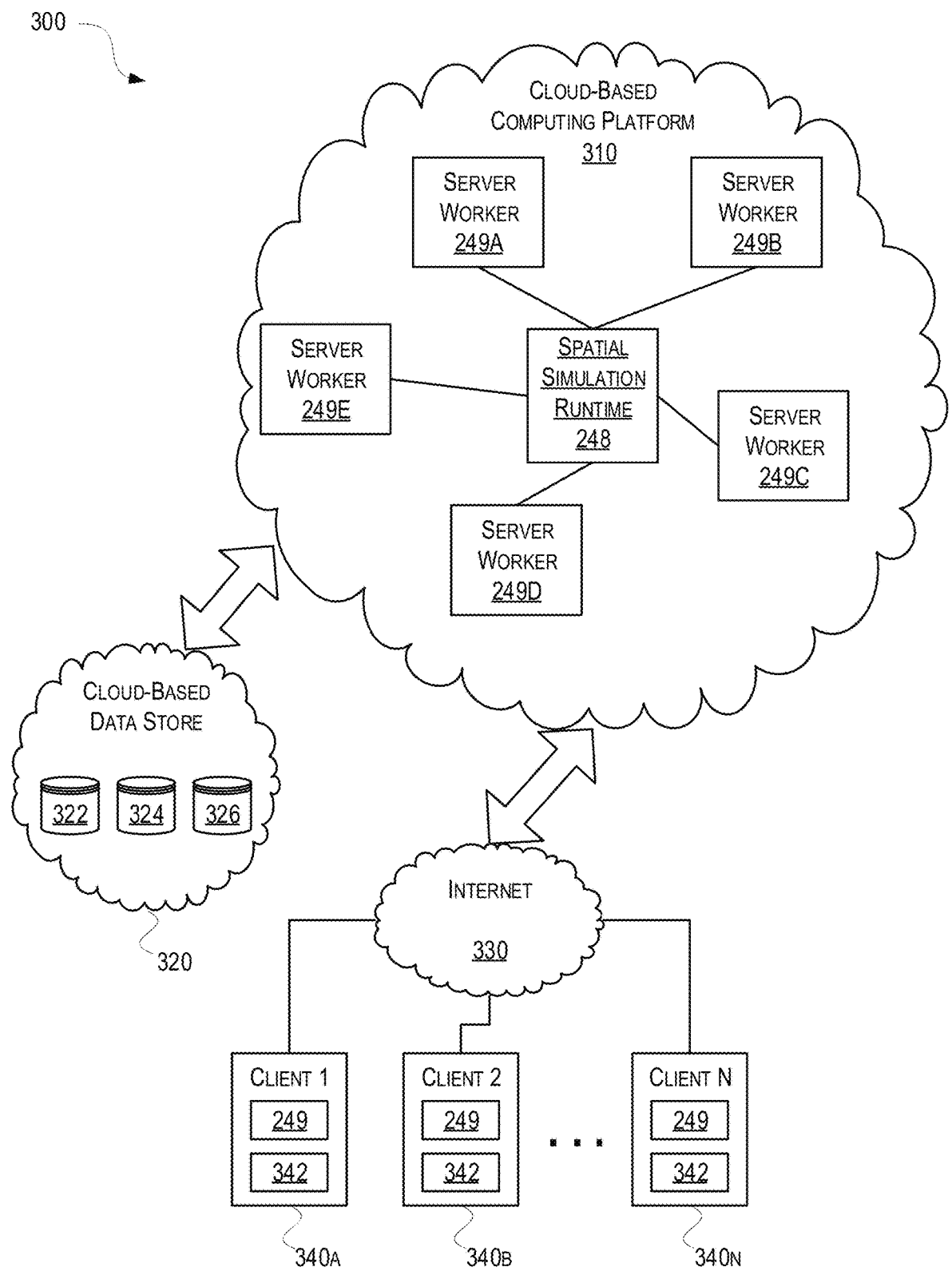
FIG. 3 depicts an illustrative cloud-based system architecture that may be used in accordance with one or more illustrative aspects described herein.

Referring to FIG. 3, some aspects described herein may be implemented in a cloud-based environment. FIG. 3 illustrates an example of a simulation environment (e.g., a development environment) based on a cloud-based computing platform system 300. As shown in FIG. 3, client computing devices 340a-340n (generally 340) may communicate via the Internet 330 to access the simulation executing on the spatial simulation runtime 248, and the workers 249). For example, the client computing devices 340 may connect to and communicate with the spatial simulation runtime 248, and the one or more workers 249 may be connected to the spatial simulation runtime 248 to perform simulation for the client computing devices 340.

The spatial simulation runtime 248 contains the program code to implement the elements and components which comprise the simulation environment, as described in further detail herein. For example, the spatial simulation runtime 248 may comprise implementation code for one or more of state synchronization modules, authority assignment modules, interest management module, subscription matching modules, and/or view synchronization modules of the cloud-based computing platform 310, as further described herein and as illustratively shown in FIGS. 10 and 11, as well as provide worker management functions (starting processes, stopping processes). Additionally and alternatively, the spatial simulation runtime 248 may also expose an application programming interface (API) which may be utilized to monitor status, instantaneously and/or periodically, of the simulation environment. The monitoring API may also be utilized to debug the status and behavior of the simulation environment. In an illustrative embodiment, the spatial simulation runtime 248 may be implemented as an executable machine code compiled from C++ code and/or as a JAR (Java ARchive).

The cloud-based computing platform 310 may comprise private and/or public hardware and software resources and components. For example, a cloud may be configured as a private cloud to be used by one or more particular customers or client computing devices 340 and/or over a private network. Public clouds or hybrid public-private clouds may be used by other customers over open or hybrid networks. Known cloud systems may alternatively be used, e.g., MICROSOFT AZURE (Microsoft Corporation of Redmond, Washington), AMAZON EC2 (Amazon.com Inc. of Seattle, Washington), GOOGLE COMPUTE ENGINE (Google Inc. of Mountain View, California), or others.

The simulation development environment 300 may be deployed as a Platform-as-a-Service (PaaS) cloud-based computing service which may provide a platform for allowing a user to develop, run, and manage a simulation. This may allow a user or client to create a simulation without understanding the intricacies of distributed computation or requiring access to infrastructure teams or supercomputers. The simulation development environment 300 may be delivered as a public cloud service from a provider. In such a scenario, client organizations may provide pre-existing models, simulations, and/or databases which may be integrated with the simulation development environment 300. Alternatively, the simulation development environment may be delivered as a private service within a private network of a client organization.

The cloud-based computing platform 310 may comprise the spatial simulation runtime 248 and one or more workers 249. Optionally, the cloud-based computing platform 310 may comprise special-purpose virtual and/or physical computing resources which may be configured to provide simulation functionality as described herein. Although FIG. 3 illustrates five workers 249, those of skill in the art will appreciate that cloud-based computing platform 310 may comprise any number of the workers 249. The workers 249 may be interconnected via one or more networks in a manner that may allow each worker 249 to communicate directly with the spatial simulation runtime 248 and/or any other workers 249 in the cloud-based computing platform 310. Optionally, the workers 249 may be arranged into a plurality of clusters of workers 249 on different virtual servers. For example, clusters of workers may be arranged based on a physical location of the physical computing resources used by the cloud-based computing platform 310. In such an example, one cluster may be a first cloud datacenter located in California, and another cluster may be a second cloud datacenter located in Ireland (these are merely illustrative locations). In another example, clusters of workers may be arranged based on an allocation to a simulation. In such a scenario, one cluster may be comprised by a first subset of virtual servers 202 allocated to a first simulation and another cluster may be a second subset of virtual servers 202 allocated to a second simulation. A worker 249 may be manually or dynamically reassigned to a different cluster if or when the worker 249 is moved or if or when the computing resource requirements for the first simulation and the second simulation may change over time.

The cloud-based computing platform system 300 may also comprise a cloud-based data store 320. The storage resources in the cloud-based data store 320 may include storage disks (e.g., solid state drives (SSDs), magnetic hard disks, etc.) and other storage devices. Alternatively, the cloud-based data store 320 may be provided by a known cloud-based storage provider, such as, AMAZON S3 (Amazon.com Inc. of Seattle, Washington), GOOGLE CLOUD STORAGE (Google Inc. of Mountain View, California), or others. Optionally, the cloud-based data store 320 may be implemented or deployed separately from cloud-based computing platform 310 as shown in FIG. 3. Optionally, the cloud-based data store 320 may be implemented or deployed within the cloud-based computing platform 310. For example, both the cloud-based computing platform 310 and the cloud-based data store 320 may be provided by a cloud systems provider as part of the resources assigned to the cloud system by the provider.

The cloud-based data store 320 may comprise one or more application assemblies 322. The application assembly 322 may comprise data which may define entities and components of a simulation, as well as, procedures which may define one or more behaviors of each of the entities and components in a simulation. Optionally, the application assembly 322 may comprise schemas, data structures, serialized objects, and the like which may define the entities and components which make up a simulation. Optionally, the application assembly 322 may comprise computer-readable code or instructions, scripts, statically-linked libraries, dynamically-linked libraries, and the like which may define one or more behaviors for the elements in the simulation. The virtual servers 202 in the cloud-based computing platform 310 may load an application assembly from the cloud-based data store 320. The spatial simulation runtime 248 in the virtual server 202 may use the data and procedures comprised in the application assembly 322 to cause the execution of a distributed, persistent, and simulation. The cloud-based data store 320 may also comprise initialization data and/or procedures 324 which define a starting or initial condition for a simulation. For example, the cloud-based computing platform 310 may load initialization data 324 from the cloud-based data store 320 which may cause a predetermined number of entities and components to be instantiated and initialized to a predetermined initial state. In another example, the cloud-based computing platform 310 may load and may execute one or more initialization procedures 324 which may cause a predetermined number of entities and components to be instantiated and initialized to a predetermined state. In yet another example, the entities and the components may be instantiated and initialized to a predetermined state based on a combination of initialization data 324 and initialization procedures 324 loaded by the cloud-based computing platform 310 from the cloud-based data store 320.

The cloud-based data store 320 may comprise a snapshot 326 of a simulation. A simulation snapshot 326 may define a valid state of a simulation, and may comprise data and/or procedures which may return a simulation to that valid state if or when it is loaded and/or executed by the cloud-based computing platform 310 from the cloud-based data store 320. The valid simulation state defined by the snapshot 326 may be a known state or a desired state of the simulation. Optionally, the simulation state defined by the snapshot 326 may be a previously saved state of a running simulation.

A portion of the cloud-based computing platform 310 may be related, for example, the virtual servers 202 may be executing a simulation on behalf of the same end user, or on behalf of different users affiliated with the same company or organization. In other examples, certain virtual servers 202 may be unrelated, such as users affiliated with different companies or organizations. For unrelated clients, information on the virtual servers 202 or cloud-based data store 320 of any one user may be hidden from other users.

In some instances, client computing devices 340 may implement, incorporate, and/or otherwise include one or more aspects of computing device 101 and the computing device 202. The client computing devices 340 may be any type of computing device capable of receiving and processing input via one or more user interfaces, providing output via one or more user interfaces and communicating input, output, and/or other information to and/or from one or more other computing devices. For example, the client computing devices 340 may be desktop computers, laptop computers, tablet computers, smart phones, or the like. In addition, and as illustrated in greater detail below, any and/or all of the client computing devices 340 may, in some instances, be special-purpose computing devices configured to perform specific functions.

The client computing devices 340 may comprise a worker integration library 342 and an instance of a worker process 249. The client computing device 340 may utilize the worker integration library 342 and the worker process 249 to connect to a simulation executing in the cloud-based computing platform 310. As described in further detail below, a client computing device 340 may receive data from the cloud-based computing platform 310 describing relevant portions of the simulation. The worker process 249 executing in the client computing device 340 may utilize that received data to render the relevant portions of the simulation on a display or other user interface device. The client computing device 340 may also transmit data and commands to cloud-based computing platform 310 which may affect the state of the simulation. The data and commands may be transmitted in response to user input. Optionally, the transmitted data and commands may be generated in response to calculations performed by the worker integration library 342 or the worker process 249.

FIG. 3 illustrates just one example of a simulation development environment that may be used, and those of skill in the art will appreciate that the specific system architecture and computing devices used may vary, and are secondary to the functionality that they provide, as further described herein.

Figure 4:
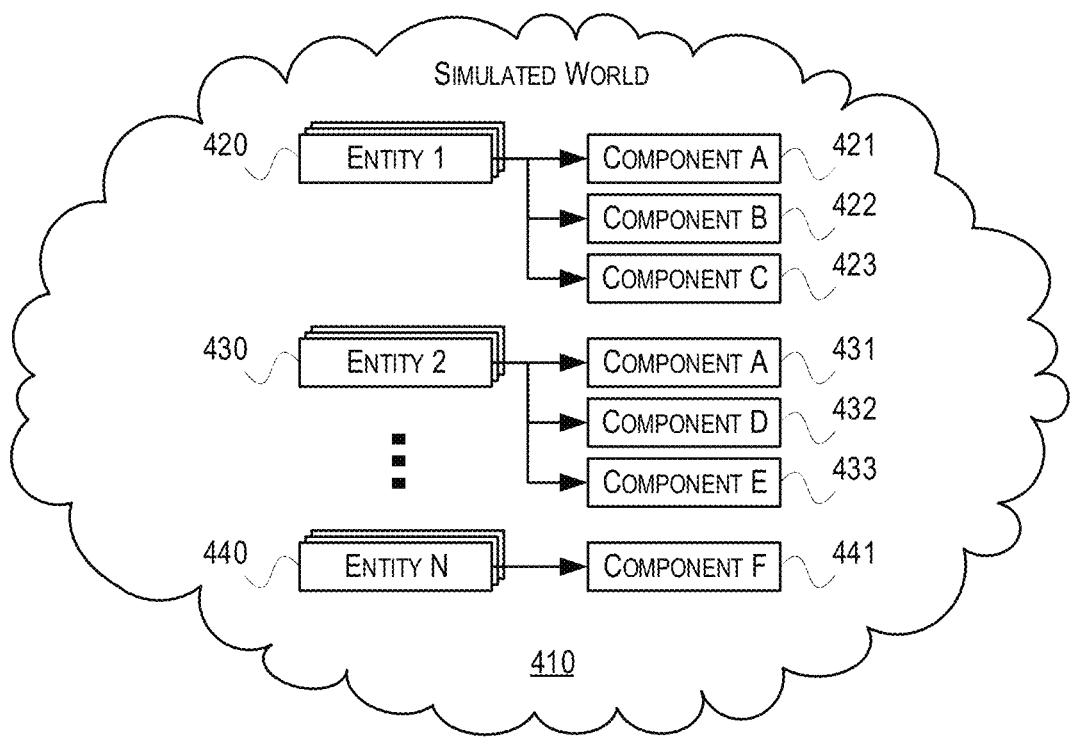
FIG. 4 depicts an illustrative entity architecture that may be used in accordance with one or more illustrative aspects described herein.

FIG. 4 illustrates one example of a block diagram of a simulation that may be implemented according to one or more illustrative examples of the disclosure. A simulated world 410 may comprise a collection of entities (e.g., entity 1 420, entity 2 430, and entity N 430). An entity may represent a fundamental computational unit or another unit of the simulated world 410. While FIG. 4 illustrates the simulated world 410 comprising three entity types, in other examples, the simulated world 410 may comprise any number of entity types. Additionally, the simulated world 410 may comprise any number of instances of each entity type. For example, in a city simulation, the simulated world 410 may comprise a car entity, a pedestrian entity, a traffic signal entity, a road entity, a building entity, and the like. In such a scenario, the city simulation may comprise large and different quantities of instances of each entity. In another example, in a video game world simulation, the simulated world 410 may comprise a monster entity, a player entity, a weapon entity, a tree entity, a rock entity, and the like. The video game simulated world may comprise a handful of instances of the monster entity, one player entity instance for each player active in the game, and potentially millions of instances of the tree and rock entities. In yet another example, in a trading simulation, the simulated world 410 may comprise a trader entity, a stock entity, a mutual fund entity, a market agent entity, and the like. The simulated trading world may comprise small numbers of trader and market agent entities and may also comprise thousands of stock and mutual fund entities.

The state and behavior of an entity (e.g., 420, 430, and 440) may be determined by the combination of components (e.g., 421, 422, 423, 431, 432, 433, and 441) comprised by the entity. Each component (e.g., 421, 422, 423, 431, 432, 433, and 441) may comprise a subset of the state and behavior attributed to the entity (e.g., 420, 430, and 440) as a whole. For example, as shown in FIG. 4, entity 1 420 may comprise component A 421, component B 422, and component C 423; entity 2 430 may comprise component A 431, component D 432, and component E 433; and entity N 440 may comprise component F 441. As will be appreciated by one of skill in the art, the number and types of components comprised by any one entity may be arbitrary and not limited to the example illustrated in FIG. 4. Optionally, two or more entities may comprise different instances of a particular component if or when the two or more entities have a set of properties and behaviors in common. For example, entity 1 420 may represent a rock in a video game simulation and entity 2 430 may represent a monster in the same simulation. Both entities (i.e., 420 and 430) may share component A (e.g., 421 and 431) which may define the properties and behaviors for a rigid body, i.e., mass and velocity.

Entities (e.g., 420, 430, and 440) may comprise properties which may be common across all entities. For example, entities (e.g., 420, 430, and 440) may comprise an identifier value which may be used to uniquely identify each entity instance within the simulated world 410. Entities (e.g., 420, 430, and 440) may comprise properties which may be shared across multiple components. For example, entities (e.g., 420, 430, and 440) in a video game simulation may comprise position and velocity values since it is likely that most components in such a simulation may require access to those values. Additionally, locating commonly used properties within an entity may reduce coupling between the components and facilitate communication between the components of an entity.

Figure 5:
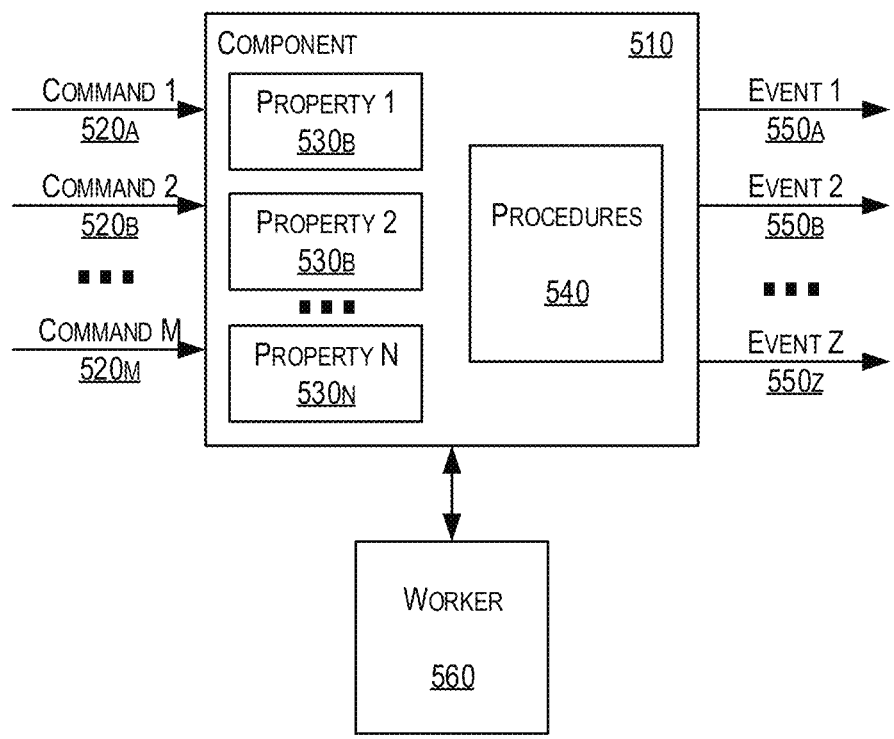
FIG. 5 depicts an illustrative component architecture that may be used in accordance with one or more illustrative aspects described herein.

Referring to FIG. 5, some aspects described herein may be implemented, incorporated, and/or otherwise included by one or more components 421, 422, 423, 431, 432, 433, and 441. FIG. 5 illustrates an example implementation of a component 510 in a simulation system as described herein. The component 510 may comprise a collection of related persistent properties 530*a*-530*n* (generally 530) and events 550*a*-550*z* (generally 550). The component 510 may also comprise procedures 540 which may change the value of the component's properties and may generate events. The procedures 540 may execute, as part of the server workers 249*a*-249*n*, in a server such as one of the servers illustrated in FIGS. 2-3 (e.g., the virtual server 202). The spatial simulation runtime 248 or other software entity may delegate the write authority of the properties and event generation from the component 510 to a specialized worker 560. Other components and/or workers executing within a simulation may cause or trigger updates in the state of component 510 via commands 520*a*-520*m* (generally 520). Alternatively, no delegation may take place.

Components may comprise one or more properties 530. The state of the component 510 may be defined by the values held by the properties 530 comprised by the component 510. Similarly, the state of an entity may be defined by the values held by the properties 530 of all the components comprised by the entity. The state of the component 510 may be stored in local memory (e.g., 242*a*-242*n*, 244*a*-244*n*, 218) for access during execution of the simulation. Optionally, the state of the component 510 may be stored in the cloud-based data store 320 as part of the snapshot 326 and thus may be persisted across simulation runs. The state of the component 510 may be stored periodically (e.g., continuously). The rate at which the state of the component 510 is persisted may vary based on one or more factors. For example, if or when the state of the component 510 changes rapidly, the storage rate may also increase commensurate with the rate of change. In another example, the storage rate may be higher for properties which may require a higher degree of accuracy than other properties.

Where it is described that an entity or component may exhibit a certain behavior, it is to be understood that another element, such as a worker module, for example, may perform the required calculations on behalf of that entity or component and emit or receive the corresponding signals or data.

One or more events 550 may indicate the occurrence of a transient action on the component 510. The component 510 may emit the one or more events 550 in response to making a determination (or events 550 may be emitted for one or more components 510), reaching a particular result, receiving user input, or another type of trigger. Other components within the simulation may monitor the occurrence of the one or more events 550 and update their state or perform an action in response to the one or more events 550. The other components may be comprised by the same entity (e.g., a worker module) as the emitting component or may be comprised by other entities within the simulation. For example, a traffic signal entity in a city simulation may emit an event if or when the traffic signal indicator changes to red. A vehicle entity in the city emulation may receive the event and may come to a stop in response to the event. In another example, a rigid body component may emit an event if or when it has determined that it has collided with another object.

In some examples, the component 510 may comprise procedures 540 which may update the values of properties 530, as well as, cause the component 510 to emit the events 550. The procedures 540 may also receive and process commands 520 from other components and/or the spatial simulation runtime 248. Thus, the procedures 540 may define the behavior of the component 510 within the simulation. Additionally or Alternatively, the spatial simulation runtime 248 may delegate to a specialized worker 560 the implementation of the behavior of the component 510. In such a scenario, the spatial simulation runtime 248 may delegate write access of properties 530 and events 550 from the component 510 to the specialized worker 560. The component 510 may have at most one writer assigned to it at any one time. Thus, the spatial simulation runtime 248 may remove the ability of procedures 540 to modify the properties 530 and emit the events 550 until delegation to the specialized worker 560 is revoked. Optionally, the specialized worker 560 may implement the behavior of a component based on real-time and/or real-world behavior of a physical entity being simulated. For example, the specialized worker 560 may periodically collect position, velocity, and direction data from one or more sensors mounted on a vehicle or other moving object and use that information to modify the properties 530 and emit the events 550 of the component 510. In another example, the specialized worker 560 may receive previously recorded real-world position, velocity, and direction data of a vehicle or other moving object and use that information to modify the properties 530 and emit the events 550 of component 510. Thus, the specialized worker 560 may be used to incorporate real-time and/or real-world into the spatial simulation. Any other real-world objects, people, events, and/or systems may be used to generate data as input for a simulation.

Delegation may require specification of a worker constraint which may identify a type of worker capable of simulating the behavior of component 510. The worker 560 may be one of a plurality of worker types which may be specialized to perform certain kinds of computations. The specialized workers 560 may only understand a subset of the components (e.g., 421, 422, 423, 431, 432, 433, and 441) that define entities (e.g., 420, 430, and 440) within the simulation 410. For example, in a city simulation, one worker type may simulate vehicle positions, another worker type may simulate traffic signals, and yet another worker type may simulate environmental emissions.

The worker 560 may comprise data structures and/or objects and software programs to simulate the behavior of a subset of the components (e.g., 421, 422, 423, 431, 432, 433, and 441) within the simulation 410. The worker 560 may be a process corresponding to one or more aspects of the workers 249, as described in FIGS. 2 & 3. Thus, the worker 560 may execute, as part of the server worker 249a-249n, in a server such as one of the servers illustrated in FIGS. 2-3 (e.g., the virtual server 202). The worker 560 may read the properties 530 of any component (e.g., 421, 422, 423, 431, 432, 433, and 441) in the simulation 410. However, the worker 560 may only write the properties 530 of those components (e.g., 421, 422, 423, 431, 432, 433, and 441) that have delegated their write authority to the worker 560. The worker 560 may be said to be authoritative for the component 510 if or when the component 510 has delegated its write authority to the worker 560. The worker 560 may be authoritative to a subset of entities (e.g., 420, 430, and 440) within the simulation 410. Optionally, the worker 560 may be authoritative to one or more entities which may be located close to each other within the simulation 410.

In order to simulate the behavior of a component (e.g., 421, 422, 423, 431, 432, 433, and 441), the worker 560 may need information (e.g., properties, events) from nearby entities (e.g., 420, 430, and 440) within the simulation 410. For example, a worker simulating a traffic intersection in a city simulation may need information from vehicles in nearby intersections, but not from vehicles which are miles away from the intersection. The interest region for worker 560 may comprise all regions comprising nearby entities (e.g., 420, 430, and 440) from which the worker 560 needs information. The interest region for worker 560 may comprise entities (e.g., 420, 430, and 440) for which worker 560 is not authoritative. The simulation 410 may automatically synchronize the data between worker 560 and the other workers which are authoritative for the nearby entities. Additional details of matching worker's interest and corresponding entities will be described in connection with FIGS. 12 and 13.

Figure 6:
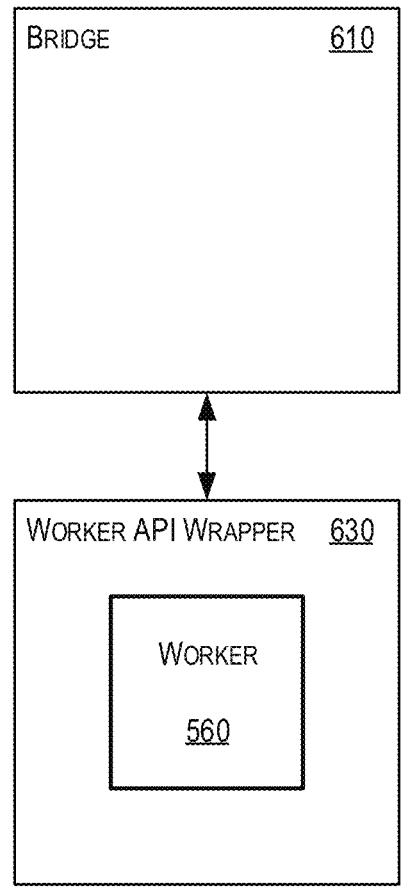
FIG. 6 depicts an illustrative worker architecture that may be used in accordance with one or more illustrative aspects described herein.

The worker 560 may communicate with the simulation 410 (e.g., with entities) via a bridge (e.g., stored state and the spatial simulation runtime 248 logic pertaining to an individual worker connection) 610, as illustrated in FIG. 6. In one or more aspects of the disclosure, the bridge may be implemented as part of a central registry (e.g., worker connection manager) in the spatial simulation runtime 248. In this case, functions of the bridge may be replaced by or integrated into a database and runtime logics within the spatial simulation runtime 248. However, a person of ordinary skill in the art may implement the bridge as an independent software module that can run on a server for synchronization of a world view with a worker connection. For example, the bridge 610 may execute, as part of the server worker 249*a*-249*n*, in a server such as one of the servers illustrated in FIGS. 2-3 (e.g., 240*a*-240*n*, 202*a*-202*f*, and 340*a*-340*n*).

FIG. 6 illustrates an example implementation of the worker 560 communicating with the bridge 610 in the simulation 410 as described herein. The bridge 610 may be responsible for communicating relevant information (e.g., properties, events) from the worker 560 to other interested workers within the simulation 410. The bridge 610 may also be responsible for communicating relevant information from nearby entities within the interest region for the worker 560. The bridge may be responsible for communication with all connected workers. Alternatively, the bridge 610 may be assigned to only one worker and the worker may communicate with only one bridge. That is, there may be a one-to-one relationship between the bridge 610 and the worker 560.

The worker 560 may communicate with the spatial simulation runtime 248 directly without communicating with the bridge 610. For example, communication between the spatial simulation runtime 248 and the worker 560 may be effectuated via a worker application programming interface (API). The worker 560 may be wrapped by a worker API wrapper 630. Alternatively, the worker API wrapper 630 may allow the worker 560 which may have been developed independently from the simulation development environment to possibly function within and managed by the bridge 610. The worker API may allow for the integration of pre-existing non-distributed simulation programs into a large-scale distributed simulation. For example, a game engine (e.g., UNITY by Unity Technologies SF of San Francisco, California) may be integrated into a simulation to simulate rigid-body physics or to provide client-side rendering and navigation. In another example, a multi-modal traffic flow simulation software package (e.g., open source MATSIM, or other commercially available software packages) may be integrated into a city simulation. Other worker engines or programs may alternatively or also be used.

The worker API may allow a bridge to add or remove entities from the interest region of a worker, notify a worker of component state changes, delegate a component to a worker or to remove the delegation, and/or signal component state changes for components on which the worker is authoritative, among other related functionality as described herein.

Among the functions provided by the worker API may be functions for adding or removing an entity. For example, the worker API wrapper 630 may comprise a handler method to be called by the bridge 610 when an entity enters the interest region of the worker 560. For example, Method 1 is one example of a method signature that may be used to add an entity to the interest region of the worker 560.
Method 1:
    void OnEntityAdd(EntityId eid, EntityState initialState); where
    eid is a value which may uniquely identify the entity being added; and
    initialState is a data structure and/or object which may describe the initial state of the entity being added.

Although Method 1 is provided as an example for adding an entity to the interest region of the worker 560, various other methods and/or functions may be used. For instance, other parameters may be included in the method without departing from the disclosure. Method 1 may then be passed to a RegisterEntityAddHandler( ) worker API function, which may cause the Method 1 handler to be called whenever an entity should be added.

The worker API wrapper 630 may also comprise a handler method to be called by the bridge 610 when an entity leaves the interest region of the worker 560. For example, Method 2 is one example of a method signature that may be used to remove an entity from the interest region of the worker 560.
Method 2:
    void OnEntityRemove(EntityId eid); where
    eid is a value which may uniquely identify the entity being removed.

Although Method 2 is provided as an example for removing an entity from the interest region of the worker 560, various other methods and/or functions may be used. For instance, other parameters may be included in the method without departing from the disclosure. Method 2 may then be passed to a RegisterEntityRemoveHandler( ) worker API function, which may cause the Method 2 handler to be called whenever an entity should be removed.

The worker API may also comprise functions for notifying a worker that the properties of a component within the worker's interest region have changed state. For example, the worker API wrapper 630 may comprise a handler method to be called by the bridge 610 when the properties of a component within the interest region of the worker 560 have changed state. Method 3 is one example of a method signature that may be used to notify the worker 560 of the changed state.
Method 3:
    void OnStateChanged_Component1(EntityId eid, SomeState state); where
    eid is a value which may uniquely identify the entity which may comprise the component whose properties changed state; and
    state is a data structure and/or object which may describe the state of the component.

Although Method 3 is provided as an example for notifying the worker 560 of a changed state, various other methods and/or functions may be used. For instance, other parameters may be included in the method without departing from the disclosure. In some variants, the state parameter may comprise only the subset of properties of the component that have changed since the last update, for efficiency. Method 3 may then be passed to a AddComponentStateChangeHandler( ) worker API function, which may cause the Method 3 handler to be called whenever the properties of a component within the worker's interest region have changed state.

Among the functions provided by the worker API may be functions for dynamically changing component authority assignments. Worker API wrapper 630 may comprise a handler method to be called by the bridge 610 when the worker 560 may now be authoritative for a component. For example, Method 4 is one example of a method signature that may be used to delegate component authority to worker 560.
Method 4:
    void OnComponentDelegate(EntityId eid, ComponentId cid); where
    eid is a value which may uniquely identify the entity which may comprise the component being delegated; and
    cid is a value which may uniquely identify the component being delegated.

Although Method 4 is provided as an example for delegating component authority to the worker 560, various other methods and/or functions may be used. For instance, other parameters may be included in the method without departing from the disclosure. Method 4 may then be passed to a RegisterComponentDelegateHandler( ) worker API function, which may cause the Method 4 handler to be called whenever the worker 560 may now be authoritative for a component.

The worker API wrapper 630 may also comprise a handler method to be called by the bridge 610 when the worker 560 may no longer be authoritative for a component. For example, Method 5 is one example of a method signature that may be used to remove delegation authority for a component from the worker 560.

Method 5:
    void OnComponentUndelegate(EntityId eid, ComponentId cid); where
        eid is a value which may uniquely identify the entity which may comprise the component being undelegated; and
        cid is a value which may uniquely identify the component being undelegated.

Although Method 5 is provided as an example for removing delegation authority for a component from the worker 560, various other methods and/or functions may be used. For instance, other parameters may be included in the method without departing from the disclosure. Method 5 may then be passed to a RegisterComponentUndelegateHandler( ) worker API function, which may cause the Method 5 handler to be called whenever the worker 560 may no longer be authoritative for a component.

In yet other examples, the worker API wrapper 630 may comprise a handler method to be called by the bridge 610 for setting or unsetting the worker 560 as authoritative for a component. For example, Method 7 is one example of a method signature that may be used to set or remove delegation authority for a component for the worker 560.

Method 6:
    void SetIsAuthoritative(EntityId eid, ComponentId cid, Boolean isAuthoritative); where
        eid is a value which may uniquely identify the entity which may comprise the component;
        cid is a value which may uniquely identify the component; and
        isAuthoritative is a true/false value which may indicate whether to set or unset the worker 560 as authoritative for a component.

Although Method 6 is provided as an example for setting or unsetting the worker 560 as authoritative for a component, various other methods and/or functions may be used. For instance, other parameters may be included in the method without departing from the disclosure.

The worker API may also comprise functions for notifying other workers that the properties of a component for which the worker 560 is authoritative have changed state. For example, the worker API wrapper 630 may comprise a method to be called by the worker API wrapper 630 when the properties of a component for which the worker 560 is authoritative have changed state. Method 7 is one example of a method signature that may be used to update the properties of the components for which the worker 560 is authoritative.

Method 7:
    void UpdateState_Component1(EntityId eid, SomeState state); where
        eid is a value which may uniquely identify the entity which may comprise the component whose properties changed state; and
        state is a data structure and/or object which may describe the updated state of the component.

Although Method 7 is provided as an example for updating the properties of the components for which the worker 560 is authoritative, various other methods and/or functions may be used. For instance, other parameters may be included in the method without departing from the disclosure. Method 7 may be called whenever the properties of a component for which the worker 560 is authoritative have changed state.

For example, the worker 560 may be configured to periodically send a heartbeat signal to the bridge 610. If or when the worker 560 ceases to transmit heartbeat signals, the bridge 610 may determine that a worker process may have terminated unexpectedly. In response to the determination, the bridge 610 may terminate cleanly and request that a replacement worker process (and potentially a new counterpart bridge) be allocated and instantiated.

Figure 7:
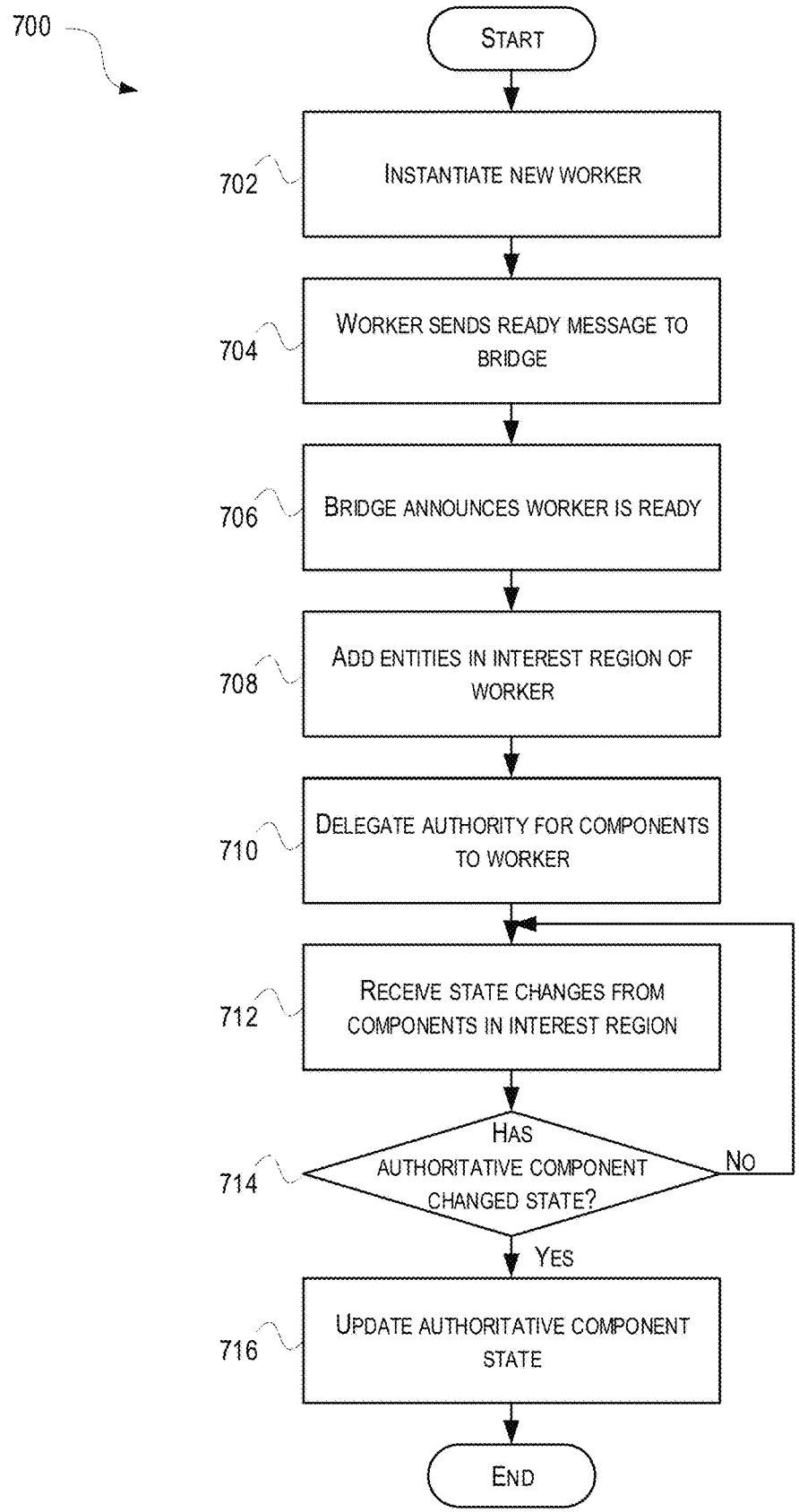
FIG. 7 illustrates a flow chart of an example method for registering a worker process that may be used in accordance with one or more illustrative aspects described herein.

FIG. 7 illustrates a flow chart of an example method for registering a worker process with a simulation. The algorithm shown in FIG. 7 and other similar examples described herein may be performed in a computing environment such as the system illustrated in FIGS. 3-6, as well as other systems having different architectures (e.g., all or part of FIGS. 1-2). The method illustrated in FIG. 7 and/or one or more steps thereof may be embodied in a computer-readable medium, such as a non-transitory computer readable memory.

Referring to FIG. 7, at step 702, a spatial simulation runtime (e.g., the spatial simulation runtime 248) may have instantiated and provisioned a server worker process on a virtual server (e.g., the virtual server 202) based on a determination that a new worker (e.g., the worker 560) instance was needed. For example, the spatial simulation runtime may have detected increased simulation workload which may require an additional worker instance to be created. In another example, the spatial simulation runtime may have detected that a pre-existing worker instance may have crashed and need to be replaced by a new worker instance. At step 704, the new worker may send a message or otherwise signal to a bridge (e.g., the bridge 610) that the new worker is ready to accept simulation work. In response to the receipt of the ready message from the new worker, the bridge may announce to the spatial simulation runtime that the worker is ready to accept simulation work, as shown at step 706. The spatial simulation runtime may, at step 708, cause the bridge to add one or more entities to the interest region of the new worker. For example, the bridge may call an OnEntityAdd method in a worker API wrapper (e.g., the worker API wrapper 630) to add one or more entities. The spatial simulation runtime may, at step 710, cause the bridge (or other entity or module) to delegate write authority of one or more components to the new worker. For example, the bridge may call an OnComponentDelegate method in the worker API wrapper to delegate authority for one or more components. At step 712, the bridge may notify the new worker that one of the components within the interest region for the new worker has changed state. For example, the bridge may call an OnStateChanged_Component1 method in the worker API wrapper to notify the new worker of the change in the state of the component. The new worker may recalculate the state for each of the one or more components for which is it authoritative. If or when the new worker determines, at step 714, that the state of a component has changed, then the worker API wrapper may call an UpdateState_Component1 method for each one of the one or more components whose state has changed, as shown at step 716, and the method ends. If or when the new worker determines, at step 714, that none of the components has changed state, then the new worker may return to step 712 and wait for another notification of a change in the state of the component in the interest region for the new worker.

A primary responsibility of a spatial simulation runtime (e.g., the spatial simulation runtime 248, SpatialOS Runtime) may be synchronizing the views of all participating workers (e.g., the worker 249, the worker 560, a server-worker instance, a client-worker instance, worker connections, worker modules). The synchronization of the views may ensure that (a) each of the workers is associated with the correct entities and components, (b) that the correct components are delegated to the corresponding workers, and (c) that any modifications to the state of the world are correctly forwarded to the interested workers. The interested workers may comprise workers that are interested to the status of the components in order to perform the computation associated with the components. For example, a worker may need more than write access authority over just one component. The worker may also need to be informed of the status of other components on other entities.

Another primary responsibility of the spatial simulation runtime may be, for example, forwarding entity commands, providing inspection services, and/or managing the lifecycle of the workers. Because the largest part of the load of the spatial simulation runtime may be caused by the synchronization of the views, view synchronization needs to be designed carefully for correctness, predictability, graceful degradation, and scalability.

Aspects of the disclosure describe a same-tick based and/or tick-stage based processing of incoming worker operations (e.g., messages, commands). As used herein, a tick may refer to an iteration of a main or primary process thread, during which all entities under simulation within that main or primary process thread are updated.

Aspects of the disclosure also describe view synchronization in a spatial simulation runtime that decouples the responsibility of a bridge into separate components, provides an abstraction of entity and query matching, and provides simple observability and testability. Aspects of the disclosure also describe methods and systems of matching changing interest queries to changing entities.

The spatial simulation runtime may operate in a tick-based cycle. The spatial simulation runtime's tick (e.g., a global tick) may run at a far higher rate than the workers' ticks. This tick-based architecture may have a number of advantages. First, while the workers connected to the spatial simulation runtime may send data based on their own frame-based ticking mechanism, the data sent by the workers might not necessarily be synchronized after the data has traversed the network and arrived at the spatial simulation runtime. Because the spatial simulation runtime's tick rate is far higher than any individual worker's tick rate, a lowest possible latency of data transfer may be achieved when receiving data from multiple worker sources.

Second, because all the processing may occur within the spatial simulation runtime's tick, there might be no asynchronous background work. Thus, it might be unnecessary to perform expensive context switching and the spatial simulation runtime may be highly efficient even when only a single CPU core is used.

Third, when dealing with load for which less than a full CPU core is required, the spatial simulation runtime may sleep temporarily by yielding the main thread between ticks. This may give the operating system an opportunity to schedule other workloads on the same CPU core with minimal impact on the spatial simulation runtime performance and latencies.

Fourth, the processing of the spatial simulation runtime may be stopped for definite and/or indefinite amounts of time and may be resumed at a later point after the last processed tick. This may enable powerful debugging workflows where the world (e.g., the simulated world 410, a game world, a SpatialOS world) may be stopped and inspected at any point on demand.

Fifth, the spatial simulation runtime's ability to process multiple worker messages in a single tick may lead to natural graceful degradation properties. As the CPU cost of each individual operation may be reduced, more operations may be processed in the same tick. This may be achieved through: (a) more efficient packetization at the network layer; (b) more efficient packetization at the compression layer; (c) utilizing the memory cache latency advantages of processing more messages together in the same tick; and/or (d) reducing the amortized cost of tick overheads (e.g., polling for new connections, updating metrics).

As described above, for incoming messages sent from a worker, the spatial simulation runtime may process the requested operations indicated by the incoming messages and apply the effects associated with the requested operations within the same tick (e.g., a single update of simulation state). The operations may comprise information indicating changes to entities and/or components. This same-tick processing may provide the spatial simulation runtime the following advantages and/or properties. First, after a fully-processed tick, a world may be in a consistent state where it may be easily snapshotted and saved to memory. Specifically, there might be no "in flight" state that has not been fully applied yet. Second, there might be no internal processing queues that may grow unboundedly and result in unbounded latency and eventually cause the spatial simulation runtime to run out of memory. If any processing queue is in danger of overflowing, it may be guaranteed to get drained after a full processing tick. Third, the spatial simulation runtime may offer atomicity semantics with respect to causes and observed effects of an operation that wouldn't be possible if some effects are processed asynchronously in a future tick.

Because a tick-based architecture used by the spatial simulation runtime may be fundamentally synchronous. To support sharding across CPU threads, the spatial simulation runtime may separate a tick into a number of stages (e.g., three stages) in which bridges and/or components may be allowed write exclusive access to different parts of shared memory while nobody is reading. The spatial simulation runtime may impose restrictions for each tick stage with respect to which parts of the internal state can be written to and read from. This may allow the spatial simulation runtime to process in parallel without using any concurrent data structures that support simultaneous reading and writing. In addition, a unified API might not be required within the spatial simulation runtime to access all of these memory regions at any point in time from any component or thread. The components that perform various functions during the tick stages will be described in connection with FIGS. 10 and 11.

Figure 8:
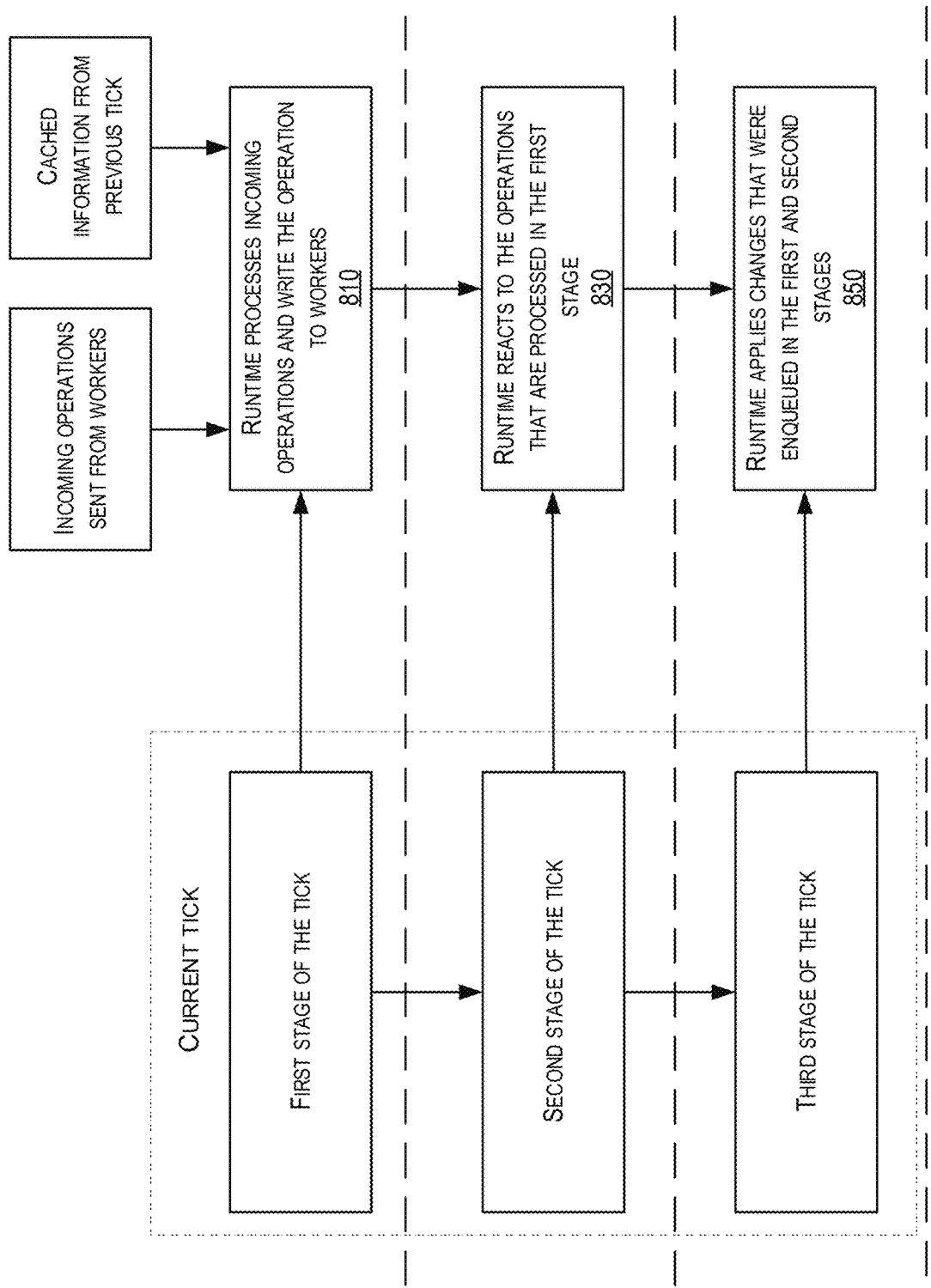
FIG. 8 illustrates a flow chart of an example method for tick-stage based processing that may be used in accordance with one or more illustrative aspects described herein.

FIG. 8 shows a tick-stage based processing of incoming worker operations. In FIG. 8, a spatial simulation runtime's tick (e.g., a current global tick, a single update of simulation state) may comprise three stages. The tick stages may not overlap, and in each stage, the processing of the information may be completely drained (e.g., there is no rate limiting/preempting of tick stages). There might be no restriction on the order of the tick stages, although the ordering may affect non-functional requirements such as latency.

At step 810 and in the first tick stage, a spatial simulation runtime (e.g., the spatial simulation runtime 248) may process the incoming work operations sent from a corresponding worker (e.g., the worker 560) and write the operations to other workers. The incoming operations may comprise component updates and/or command requests (e.g., remote procedure calls (RPC) contained in the components). The other workers may receive the incoming worker operations from the corresponding workers and/or information (e.g., interest and authority state information) cached in the previous tick. The cached information might not be applied in the previous tick.

For each different operation type, the spatial simulation runtime may write the operation to the world. For example, if a worker is authoritative (e.g., the worker has the authority over a component on an entity), the worker may apply a component update to the entity data (e.g., canonical entity data), and fan out (e.g., deliver, spread, send) the component update to other interested workers using the spatial simulation runtime. From the spatial simulation runtime's perspective, each worker may be modeled as a queue to which outgoing messages can be appended. For a command request, a worker may enqueue a message onto the worker's outgoing message queue. For example, an incoming command request from worker A may be forwarded to worker B by enqueuing a message onto worker A's outgoing message queue. At the end of each tick, all outgoing queues may be flushed by notifying the underlying networking library (e.g., an Asio library) to generate network packages that are to be sent to other workers over a network socket.

Command requests may be divided into two categories: system commands and entity commands. System commands may instruct the spatial simulation runtime to take certain actions such as creating or deleting an entity. For example, an entity creation request may enqueue an operation for an entity database (e.g., an entity database index) to add the entity. The entity database may store component data (e.g., the canonical value of component data) for each entity. Entity commands may instruct the spatial simulation runtime to forward the command request from an original requesting worker to an authoritative worker for asynchronous processing. The authoritative worker may react to the command request and produce a response. The authoritative worker may respond with a response. The spatial simulation runtime may then route the response back to the original requesting worker.

The following rules and/or restrictions may be applied during the first tick stage: (a) the spatial simulation runtime may send operations and/or messages to a worker which it is directly communicating with. For example, a command associated with an operation may fail if the entity cannot be found (e.g., no write access authority by the worker); (b) A worker may write to the component state (e.g., properties of the component of the entity) only if the worker is an authoritative worker; (c) A worker may read the component states only if the worker is an authoritative worker; (d) A worker may check for the existence of entities; (e) A worker may read any component's authority, but might not write to it; and/or (f) A worker may send messages to other workers. For example, a worker may send a message to another worker to notify the another worker of a command request (e.g., entity commands).

At step 830 and in the second tick stage, the spatial simulation runtime may react to the operations that are processed in the first tick stage. For example, the spatial simulation runtime may flush (e.g., cache, store) all component updates which were fanned out to it in the first tick stage. The spatial simulation runtime may also send command requests that were sent to the spatial simulation runtime in the first tick stage to the corresponding worker(s). The spatial simulation runtime may also search for any new entities which the workers might be interested in, and send any new entities to the interested workers.

The following rules, actions, and/or restrictions may be applied to the workers during the second tick stage: (a) A worker may send the command requests (e.g., new entities) to the corresponding worker; (b) A worker may read components' states; (c) A worker may read a component's authority, but might not write to it; (d) A worker may recalculate any entity's authority because the worker can read all of the entity's components and the worker may then enqueue the authority changes to be applied in the housekeeping stage; and/or (e) A worker may have read access to the entity database. But some of these actions may be modified based on the design of the spatial simulation runtime. For example, (a) and (c) may be performed in a first tick stage instead of a second tick stage, which will be described below in connection with FIG. 10.

At step 850 and in the third tick stage, the spatial simulation runtime may apply any changes (e.g., interest and authority updates) that were enqueued in the previous tick stages. For example, the spatial simulation runtime may apply pending authority changes and update the authority states. The authority messages may be sent to the relevant workers (e.g., to be processed in the second stage of the next tick). The spatial simulation runtime may comprise a plurality of singleton components (e.g., modules) and each singleton component may perform functions over different tick stages or sub-stages. The actions performed in the third tick stage described herein may also be modified based on the design of the singleton components, which will be described below in connection with FIG. 10.

Because a spatial simulation runtime's tick may be divided into a number of tick stages and each of the tick stages may comprise different restrictions and/or rules with respect to which parts of the internal state can be written to and read from, the above structure may have the following advantages. First, the explicit control over data access may cause each tick stage to be individually multithreaded. Each tick stage may be sharded according to a strategy appropriate for the specific kind of processing in the tick. For example, incoming worker messages may be dispatched for each worker in parallel, and authority states may be recomputed for each updated entity in parallel.

Second, because the transitions between the tick stages effectively act as a memory barrier, this allows for shared-memory parallelism in different tick stages without any locking mechanisms (e.g., a limit on access to resources), which further leads to efficient use of an arbitrary number of cores on a single machine, without unpredictable latencies due to locking. The dashed lines in FIG. 8 indicate the memory barriers among different tick stages.

Third, read and write restrictions for tick stages may serve as a powerful internal API contract between components or modules. Therefore, a modular design with low coupling and high cohesion may be advantageous. A component that only reads from one data structure and only writes to another may be much easier to test and validate than one that modifies existing state in complex and intricate ways. Additional details of the modular design will be described in connection with FIGS. 10 and 11. The tick stages described above may be modified based on the modular design of the spatial simulation runtime, as described below.

As discussed above, an instance of a bridge may be created for each worker connection. The bridge may be responsible for performing synchronization and storing the necessary states needed for the synchronization. Because the bridge contains another view state, the view synchronization problem for an individual worker may be reduced to synchronizing the view of the worker with the view of its bridge. This may decouple the internal representation of a view from the language required to synchronize the worker view, which is represented by the worker protocol. The bridge, however, can be optional or integrated into the spatial simulation runtime, as discussed above.

In general, component state (e.g., component schema data on present entity components) changes may occur more frequently than interest and authority changes. The interest changes may comprise the workers' changes of the interest in one or more components of entities. However, component state changes may depend on authority and/or interest, because a worker may be able to update component states only when it has the authority over a component, and another worker may receive that component update only when it has an interest over that component. Therefore, the results of the interest and authority computation may be cached for fast component state updates, and they may be recomputed when necessary. A bridge view (e.g., a bridge's internal view state, or a spatial simulation runtime's internal view state) in a spatial simulation runtime may comprise only the authority and interest data of the corresponding worker view, and may exclude data associated with the component state. For example, a bridge view delta in the spatial simulation runtime describing the differences between two bridge views might not contain component updates. It is important to create a simulation system to effectively compute bridge view deltas.

Figure 9A:
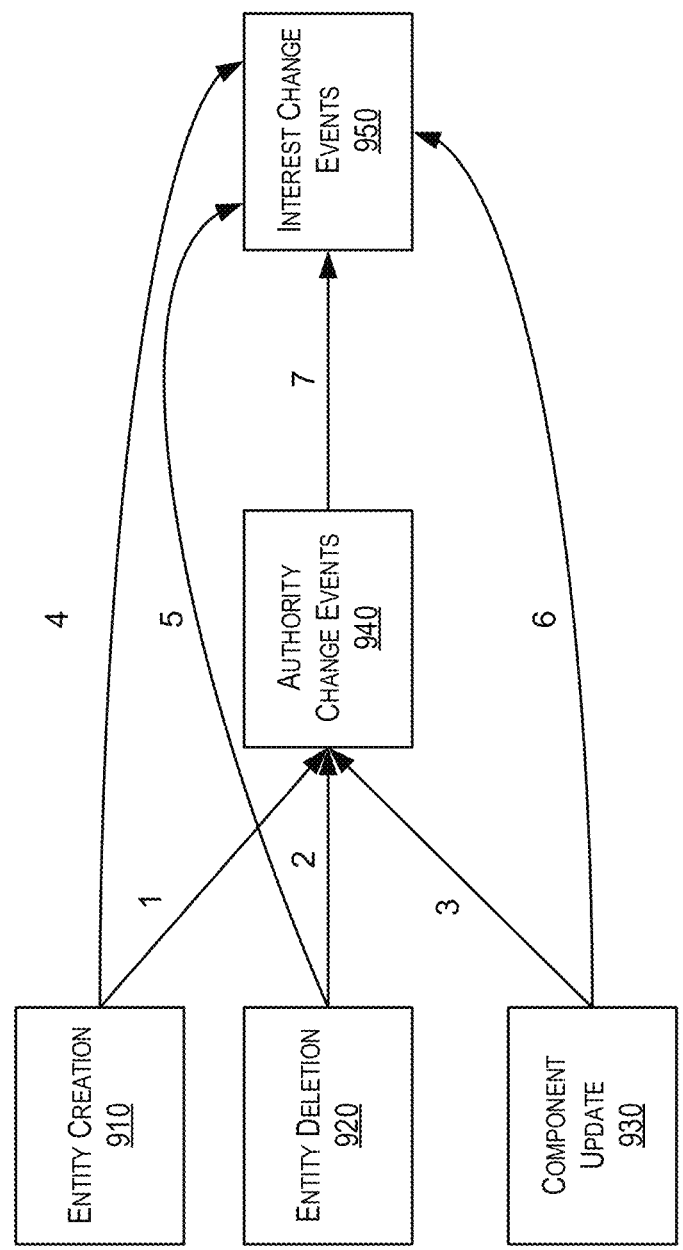
FIGS. 9A and 9B depict examples of causes of view changes in accordance with one or more example embodiments.
Figure 9B:
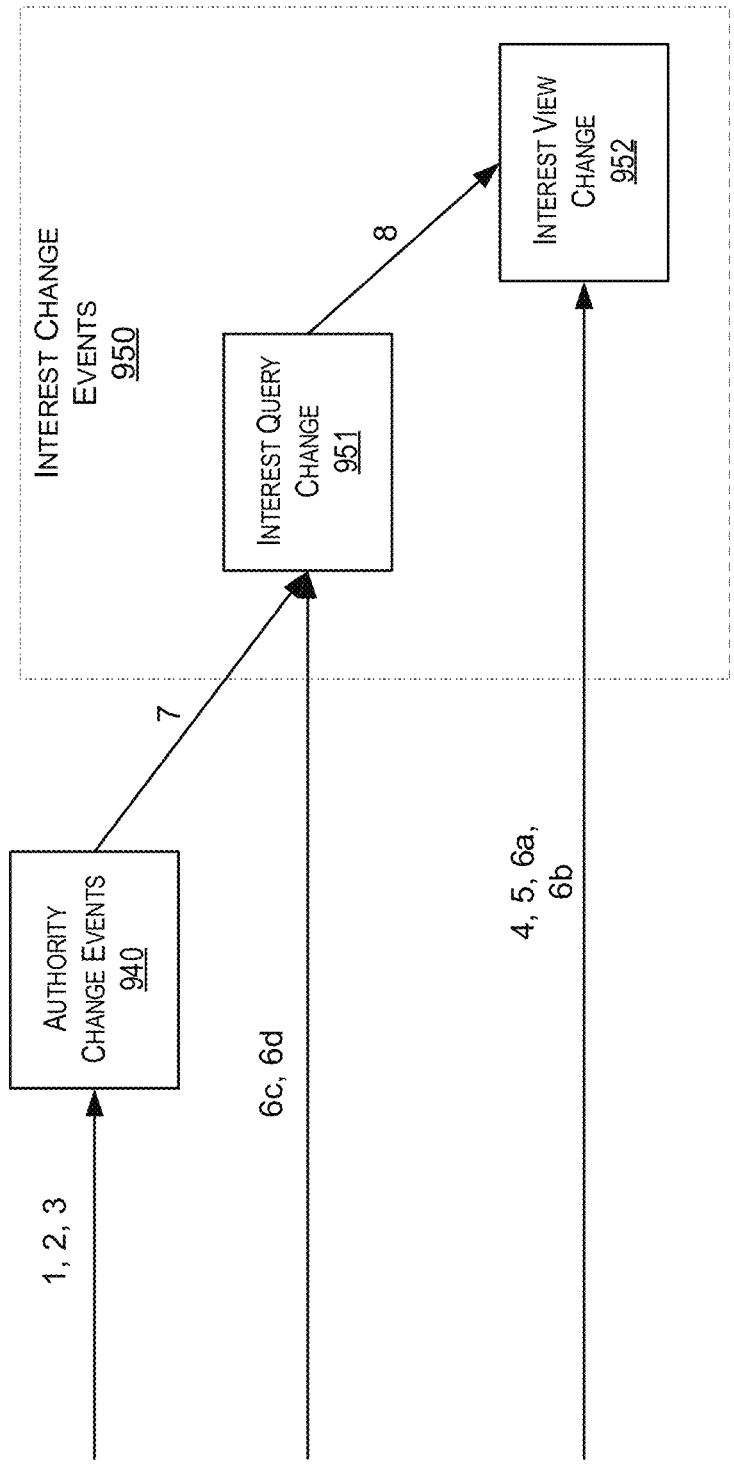

FIGS. 9A and 9B illustrate examples of causes of view changes (e.g., bridge view deltas). Specifically, FIGS. 9A and 9B illustrate how entity changes may cause (e.g., trigger) authority change events and interest change events. FIG. 9B may be a continuation of FIG. 9A and further illustrates the right half of FIG. 9A.

Referring to FIG. 9A, authority change events 940 may be caused by entity creation 910, entity deletion 920, and/or component updates 930 (each labeled "1," "2," and "3" respectively in FIG. 9A). The entity creation 910 may comprise the creation of an entity using, for example, Method 1 described above. For example, an entity may be created with an EntityAcl component that delegates a component on this entity to a worker. EntityAcl may be an access control list (ACL) component in a standard schema library associated with an entity, and may define whether a worker type or a specific worker has write access permission and/or read access permission to one or more components on the entity.

The entity deletion 920 may comprise the deletion of an entity using, for example, Method 2 described above. For example, an entity that has an EntityAcl component may be deleted, which may result in an undelegation of a component on this entity from a worker.

The component updates 930 may comprise one or more updates of an entity's EntityAcl or position component such that authority over a component on the entity may be delegated to or undelegated from a worker. The position may be a component in a standard schema library and may indicate a position of an entity in the world (e.g., a location of a car in a game). As an example, an EntityAcl change may either delegate or undelegate authority for a specific worker and/or a load balanced layer (e.g., worker attribute). In some examples, only one worker may have write access authority to an entity's component at any one time. Therefore, when an entity moves from one worker's area of authority (e.g., domain) to another, write access authority over the entity's components may be transferred (e.g., undelegated from the previous worker and delegate to the new worker). In addition, a position change may cause an entity to enter or leave the area of authority of a worker (e.g., a load balanced worker such as a cell in a rectangle grid). Therefore, the position change of an entity may also cause authority changes associated with the entity.

Interest change events 950 may be caused by the entity creation 910, the entity deletion 920, the component updates 930, and/or the authority change events 940 (each labeled "4," "5," "6," and "7" respectively in FIG. 9A). For example, an entity may be created and the creation of the entity may match an existing constraint of a worker's interest query, causing that worker to gain interest over the entity. A query-based interest (QBI) may specify the component data a worker has an interest in for the purpose of updating the components it has authority over. The constraint of a worker's interest query may indicate what entities the query matches. For example, a constraint of a worker's interest query may indicate that a worker is interested in cars within a 10 feet radius of a player. If a car entity is created within the 10 feet radius of the player, the entity may match the constraint of the worker's interest query and may cause an interest change event. Therefore, the worker may receive information such as updates of the car entity. Similarly, an entity may be deleted and the deletion of the entity may match a constraint of a worker's interest query, causing that worker to lose interest over the entity.

Moreover, the component updates 930 may also cause the interest change events 950. The component updates 930 that cause the interest change events 950 may comprise one or more updates of an entity's EntityAcl, position, and/or interest component. The following four examples 6a-6d illustrate how an entity's EntityAcl, position, and/or interest changes might cause the interest change events 950.

6a. An EntityAcl change may add or remove read access restrictions of an entity, which may cause a worker to gain or lose interest over the entity.

6b. A position change to an entity may cause a worker with a spatial interest query (e.g., constraints of the interest query are associated with spatial positions of entities) to gain or lose interest over this entity.

6c. A position change to an entity with a relative interest query may cause a worker to gain or lose interest over an entity matching or no longer matching that relative query.

6d. An interest change may update an interest query that causes a worker to gain or lose interest over an entity matching or no longer matching that query.

Examples 6b and 6c may be triggered by the same position change event. For example, in a game world, each of two players may control a single entity and both players may have a relative interest query set up such that they can see other players within 100 m of their entity's position. If both players are initially more than 100 m apart from each other and cannot see each other, player A may later send a position change that moves its entity within less than 100 m from player B's entity, while player B is standing still. This position change may trigger an interest change event 950 under both examples 6b and 6c. Example 6b may refer to player B having interest in a fixed 100 m radius around their own entity, and a new entity appearing within that interest radius. As a result, player B may gain interest over player A's entity. Example 6c may refer to player A having a relative interest query defined with respect to its player entity, and that interest sphere now has moved to a different place where it additionally matches a new entity. As a result, player A may gain interest over player B's entity. If the player A and player B's interests are different, then examples 6b and 6c might not be triggered at the same time. For example, if the players have different interest radii, then only one of examples 6b or 6c may be triggered.

In addition, an authority change event (e.g., the authority change events 940) may also cause the interest change events 950. For example, an authority change on an entity may activate or deactivate an interest query in the component of that entity, causing a worker to gain or lose interest over an entity matching that query. In this case, workers may gain interest over entity components without an interest query. When a worker gains authority over a component, it may imply that the worker is now responsible for simulating this component and may be writing to the component. So the worker may have interest over the component.

Because authority over a component may imply interest over the component, this may be consolidated with the QBI for the interest change events 950. For example, one method may be to interpret gaining authority as adding a trivial "this entity" query to the worker's interest queries. The added query may match the entity with the component in question, and may have a result type with the component in question. As a result, the interest manager and subscription matcher of the spatial simulation runtime (to be described in connection With FIG. 10) may operate entirely on the abstraction level of interest queries, and might not require any extract logic to handle this case.

While an authority change event may transitively cause interest change events (labeled "7" in FIGS. 9A and 9B), interest change event might not lead to an authority change event. There may be two different types of interest change events. The first type of interest change events may be caused by entities changing which queries they match (e.g., examples 6c, 6d, and 7), and the second type of interest change events may be caused by queries changing which entities they match (e.g., examples 4, 5, 6a, and 6b). Therefore, as shown in FIG. 9B, the interest change events 950 may be divided into interest query change events 951 and interest view change events 952.

Previous examples 6c, 6d, and 7 may cause interest query changes and previous examples 4, 5, 6a, and 6b may cause interest view changes. In addition, interest query changes may also cause interest view changes (labeled "8" in FIG. 9B). For example, an interest query change for a worker may cause that worker to gain or lose interest over an entity matching or no longer matching that query.

As discussed above, a spatial simulation runtime may use bridges to receive, process, and fan out different kinds of updates based on a tick-stage based structure. However, the reliance on bridges to perform the above responsibilities may lead to high coupling and unclear API boundaries between the bridges, the authority assigner, and the entity database. Moreover, the bridge-based implementation may have grown massively both in size and complex, which may cause complex bridge logics across multiple tick stages and/or multiple ticks, and may make it difficult to perform isolated unit test for the bridge and its related components. Further, it might be difficult to instrument the bridge-based implementation and make it observable with useful metrics. Therefore, it may be advantageous to decouple the responsibilities of the bridges into separate components.

Figure 10:
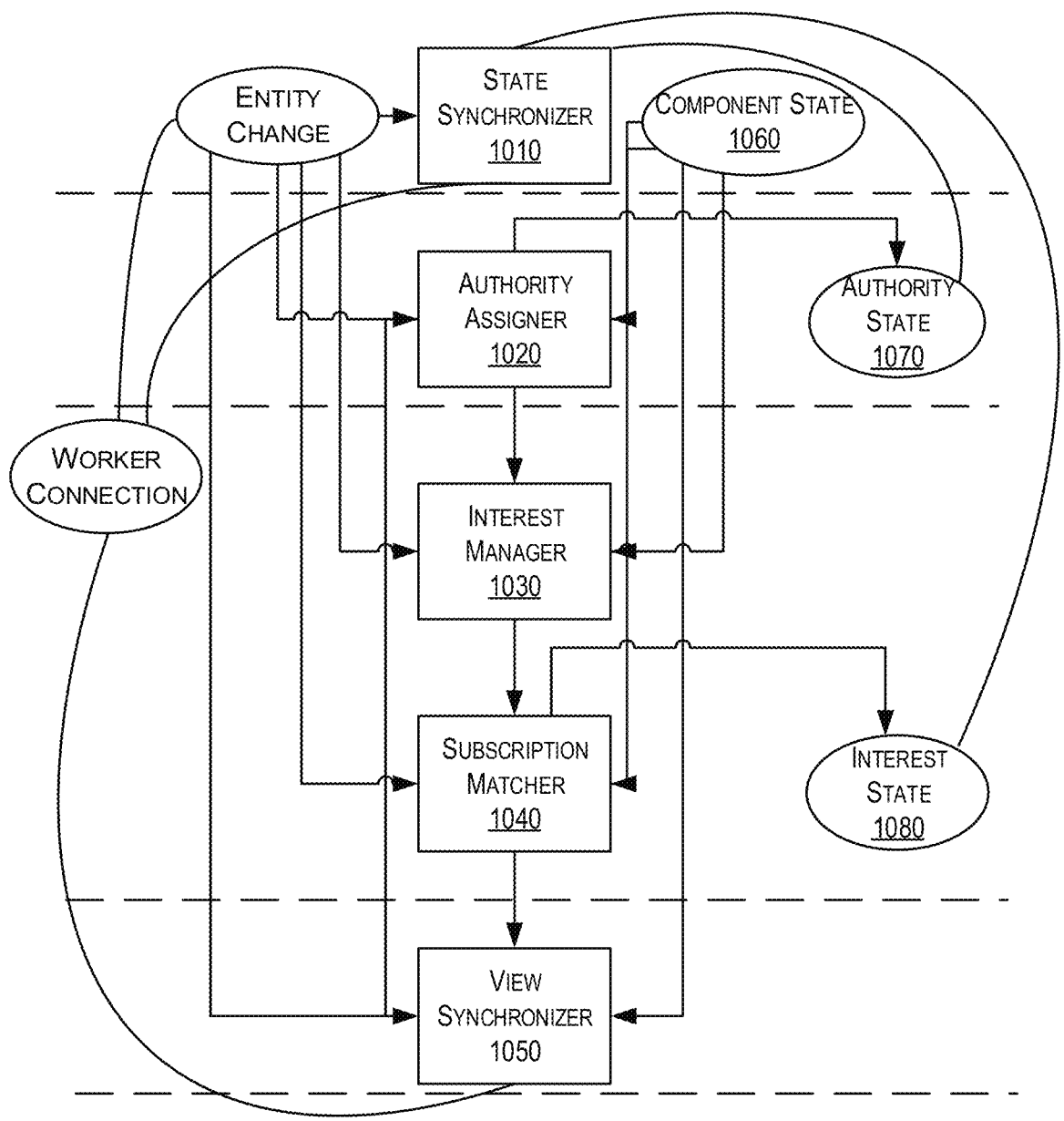
FIG. 10 depicts example modules of a spatial simulation runtime in accordance with one or more example embodiments.

FIG. 10 shows examples components (e.g., modules) of a spatial simulation runtime. A spatial simulation runtime (e.g., the spatial simulation runtime 248) may comprise one or more components such as a state synchronizer 1010 (e.g., a state synchronizer module), an authority assigner 1020 (e.g., an authority assignment module), an interest manager 1030 (e.g., an interest management module), a subscription matcher 1040 (e.g., a subscription matching module), and/or a view synchronizer 1050 (e.g., a view synchronization module). A bridge's functions may be decoupled into the components. Each component may be a C++ class that implements a message pipeline pattern. For example, each component may receive input events in a queue, and call a method (e.g., one of the methods described in connection with FIG. 7) to process input events and produce output events that are enqueued onto downstream components. The last component (e.g., the view synchronizer 1050) in the pipeline may synchronize the workers' views by sending outgoing worker protocol messages to the respective workers instead of enqueuing events. Each of the components may be separate from other components and may perform functions in parallel with other components. Each of the components may comprise may expose an API for communicating with the other components, modules, workers, and/or other computing devices. The components may perform the functions based on same-tick processing in a central event loop and each iteration of an event loop may represent a tick. For example, the components may process incoming messages from a worker within one tick of the spatial simulation runtime. One or more memory barriers (e.g., memory fences) may be used to enforce an ordering constraint on memory operations on the various components of the spatial simulation runtime. For example, the memory barriers (indicated by the dashed lines in FIG. 10) may be implemented between the state synchronizer 1010 and the authority assigner 1020, the authority assigner 1020 and the interest manager 1030, the subscription matcher 1040 and the view synchronizer 1050, and/or the view synchronizer 1050 and other components.

In order to process events in each view synchronization stage, each component may have access to a shared entity database data structure. The shared entity database may internally store a HashMap of entity IDs to entity structs, and store a HashMap of component IDs to component structs with serialized component data. Access to entity and component data may not occur directly, but may be exposed through different "state" interfaces that deal with component state, authority, and interest, respectively. These may ensure that write and read restrictions during the different tick stages are maintained and programmatically enforced.

Active worker connections may be polled for new incoming worker messages and passed into the spatial simulation runtime. The incoming worker messages may comprise entity changes. The state synchronizer 1010 may receive inputs comprising the entity changes, cached authority information, and/or cached interest information. The state synchronizer 1010 may receive the entity changes from one or more workers. The entity changes may comprise entity creation (e.g., the entity creation 910), entity deletion (e.g., the entity deletion 920), and/or component updates (e.g., the component update 930). The cached authority information (e.g., the authority change events 940) may be generated from the previous tick and stored in a database for processing in the current tick. Similarly, the cached interest information (e.g., the interest change events 950) may be generated from the previous tick and stored in the database for processing in the current tick.

The state synchronizer 1010 may determine, for each entity change event associated with each worker, whether the worker has the authority to perform the entity change. For example, the state synchronizer 1010 may query an authority state 1070 to determine whether the worker has the authority to perform the entity change. The authority state 1070 may be a database that stores and/or caches the authority information of each worker. In some examples, the authority information may be precomputed and cached in the authority state 1070 during the state synchronization tick stage. Because authority information may change, the authority state 1070 may be updated when an EntityAcl component is updated. As a result, the state synchronizer 1010 may send a component update event (e.g., the component update 930) to the authority assigner 1020, which might result in refreshing the authority state 1070 and further the emitting of an authority change event (e.g., the authority change event 940) for further processing in the remaining tick stages (e.g., sending the authority change event 940 to the interest manager 1030). The amount of authority information to store may be a single bit per worker-component pair, which can be implemented as a bitset. Interest may be implemented with another bitset indicating which workers should receive a fanned out update. If the state synchronizer 1010 determines that the worker has the authority to perform the entity change, the state synchronizer 1010 may commit (e.g., write) the entity change to memory and use interest information (e.g., stored interest information in the memory) to fan it out to other workers in the form of component update worker protocol operations. The state synchronizer 1010 may output updated component states (e.g., EntityAcl and position components states) and/or work protocol operations for component updates. The state synchronizer 1010 may write the updated component states to a component state 1060 (e.g., a memory or repository storing component states). The component state 1060 may determine and update the current component state based on the received updated component states. The databases associated with the state synchronizer 1010 may be sharded based on each of the worker connections.

The authority assigner 1020 may receive inputs comprising entity changes and EntityAcl and position components states. The authority assigner 1020 may receive the entity changes from the one or more workers and receive the EntityAcl and position components states from the component state 1060 and/or from the state synchronizer 1010. The authority assigner 1020 may determine, for each entity, whether an authority change event occurred on components of the entity by determining if one or more of previously discussed examples 1, 2, or 3 applies. For example, if an entity is created with an EntityAcl component that delegates a component on the entity to a worker (e.g., example 1), the authority assigner 1020 may determine that an authority change event occurred on the component of the entity. The authority assigner 1020 may then commit the resulting authority changes to the authority state 1070. The authority assigner 1020 may output authority change events and updated authority states. The authority assigner 1020 may also perform entity/query matching to implement load balancing strategies. The databases associated with the authority assigner 1020 may be sharded based on each of the entities or worker connections.

The interest manager 1030 may receive inputs comprising entity changes, authority change events, and/or position and interest components states. The interest manager 1030 may receive the entity changes from the one or more workers, receive the authority change events from the authority assigner 1020 or the authority state 1070, and receive position and interest components states from the component state 1060. The interest manager 1030 may determine, for each worker and each incoming worker operation, whether an interest query change event occurred by determining if one or more of previously described examples 6c, 6d, or 7 applies. For example, the interest manager 1030 may determine whether an interest query associated with a worker has been updated. The interest manager 1030 may then determine whether the worker may gain or lose interest over an entity based on the updated interest query (e.g., example 6d) and determine that an interest query change event has occurred. If the interest manager 1030 determines that one or more interest query change events have occurred, the interest manager 1030 may output the interest query change events. The interest manager 1030 may internally comprise a collection of worker query trackers. Each of the trackers may be responsible for a set of interest queries for a single worker. The databases associated with the interest manager 1030 may be sharded based on each of the worker connections.

The subscription matcher 1040 may receive inputs comprising entity changes, interest query change events, and/or component states needed by query matching such as position component states. The subscription matcher 1040 may receive the entity changes from one or more workers, receive the interest query change events from the interest manager 1030, and receive the component states from the component state 1060. The subscription matcher 1040 may determine, for each incoming worker operation, whether an interest view change event occurred by determining if one or more of previously described examples 4, 5, 6a, 6b, or 8 applies. If the subscription matcher 1040 determines that one or more interest view change events have occurred, the subscription matcher 1040 may output the interest view change events and may write the updated interest states to an interest state 1080 (e.g., a memory or repository storing interest states). Further details of the subscription matcher 1040 will be described in connection with FIGS. 12 and 13.

The view synchronizer 1050 may receive inputs comprising bridge view deltas (e.g., view changes) in the form of authority change events, interest view change events, and/or component states associated with the interest view change events. The view synchronizer 1050 might not receive any entity changes. The view synchronizer 1050 may receive the authority change events from the authority assigner 1020, receive the interest view change events from the subscription matcher 1040, and receive the component states from the component state 1060.

The view synchronizer 1050 may, for each worker and each view delta, determine (e.g., develop, create, build up) a worker view delta to synchronize all changes comprising the authority changes and the interest changes that occurred in the tick. The view synchronizer 1050 may create an internal state that comprises a bridge view for each worker. The view synchronizer 1050 may implement critical section guarantees and generate (e.g., output) worker protocol operations for adding and removing entities, adding and removing components, and/or delegating and undelegating authorities on the components. The view synchronizer 1050 may then send the worker protocol operations to the corresponding workers. The databases associated with the view synchronizer 1050 may be sharded based on each of the worker connections.

The tick stages described in connection with FIG. 8 may be modified based on the above description of various components of the spatial simulation runtime. External events may be processed before or at the beginning of a first stage of each tick. The external events may comprise incoming worker operations, incoming command requests (e.g., gRPC requests), and/or new bridge connections. The internal events may comprise state synchronization, commands processing, authority assignment, interest management and subscription matching, and/or bridge view refreshing.

The internal events may be processed in four separate tick stages. The dashed lines in FIG. 10 represent a separation of tick stages into four parts with different responsibilities based on the different components of the spatial simulation runtime. State synchronization and commands may be processed in a first tick stage; authority assignment may be processed in a second tick stage; interest management and subscription matching may be processed in a third tick stage; and bridge view refreshing may be processed in a fourth tick stage. Each tick stage may be divided into a plurality of sub-stages. For example, interest management may be processed in a first sub-stage of the third tick stage and subscription matching may be processed in a second sub-stage of the third tick stage. In addition, restrictions may be imposed regarding what state of the database the components may read from and/or write to. For example, the authority assigner 1020 may write to the authority state 1070 during its tick stage, but may only read from the component state 1060.

Each component of the spatial simulation runtime may be spread out over different tick stages as indicated by the dashed lines in FIG. 10. Only one component may be active at once during a tick stage, which provides it with the benefit of exclusive access over certain data structures and the entity database via the state interfaces. Each component may be allowed to access all worker connections during its tick stage. For example, in the bridge view refreshing tick stage, the view synchronizer 1050 may send the interest view changes 952 that result in per-worker events, which may be processed for each worker individually. But not all components may access worker connections during their tick stage. For example, the events that state synchronizer 1010 generates (e.g., entity creation 910, entity deletion 920, and component update 930) may refer to the entities directly and may result in further events (e.g., authority change events 940, interest change events 950) that are not respective to any particular worker.

While state synchronization may occur in almost every tick, other internal events may be skipped unless an entity change affects authority or interest information. In addition, when a new bridge is established and connected to a worker, authority and interest changes for the new bridge may be processed in the same tick as the connection. At the end of a tick, all the external and internal events may have been processed and all the internal message queues may be completely drained. Therefore, no remaining work might need to be performed in the next tick.

In an example, outgoing worker operations (e.g., performed by the view synchronizer 1050) may be buffered until the end of the tick and may be sent to a networking library (e.g., an Asio library) in a batch. The network library may be responsible for transmitting serialized worker operations over a network to connected workers. Because reading worker operations may be performed first in every tick and writing worker operations may be performed last in every tick, the processing of the worker operations may be performed in a single "Shunt tick."

Because the components of the spatial simulation runtime operate on event queues, the components may be completely decoupled from each other and can be tested in isolation. While it may be possible to keep bridge tests as integration tests for the view synchronization system, it may be advantageous to also unit test individual components in isolation. Components based on event queues may be easy to instrument because the rate of processed events may be tracked and the processing of the components may be measured by the type of event.

While the spatial simulation runtime is based on the same-tick processing as described earlier, everything past the initial state synchronization tick stage may be buffered and delayed to be processed in future ticks. In this way, the spatial simulation runtime may schedule operation processing according to different scheduling strategies. Those strategies can be changed and updated according to specific use cases without changing the spatial simulation runtime's architecture or implementation. Further, the spatial simulation runtime may be configured to prioritize component state update fanout over interest and authority changes. For example, low latency synchronization of the player movement of a first-person shooting game may be the most important aspect of networking. Therefore, an event scheduling strategy that continues synchronizing state as long as incoming messages are pending on any worker network connection may be used. Interest and authority changes may be delayed by only releasing the output events from state synchronization to the following tick stages in a future tick.

Figure 11:
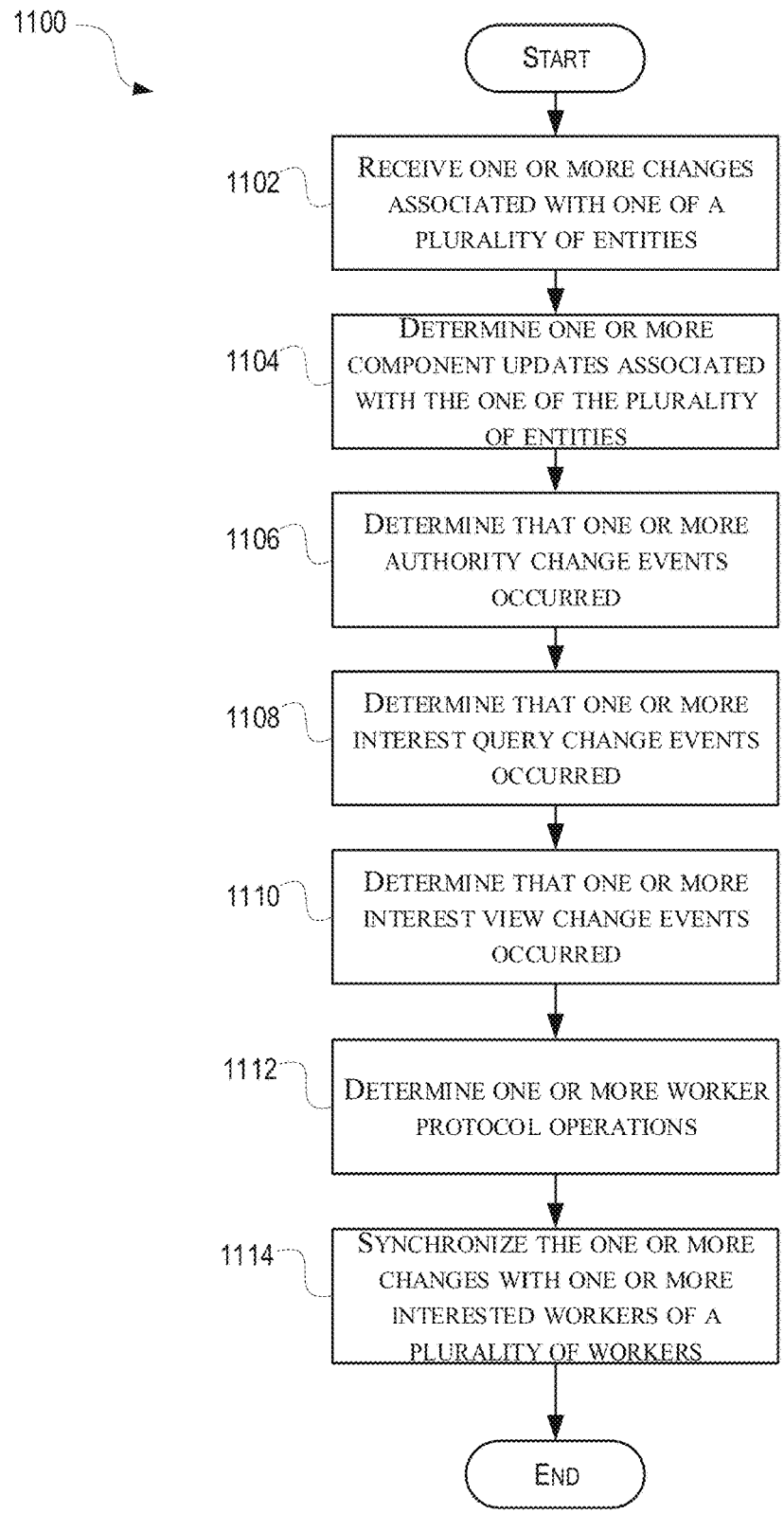
FIG. 11 illustrates a flow chart of an example method for event-based view synchronization that may be used in accordance with one or more illustrative aspects described herein.

FIG. 11 illustrates a flow chart of an example method used for view synchronization. A spatial simulation runtime (e.g., the spatial simulation runtime 248) may perform view synchronization for all participating workers to ensure each worker is associated with the correct entities and components with correct delegation. As described above, the spatial simulation runtime may run a simulation. The simulation may comprise a plurality of entities being simulated and a plurality of workers (e.g., the worker 249, the worker 560, a server-worker instance, a client-worker instance, worker connections, worker modules). Each entity of the plurality of entities may comprise one or more components, and each of the components may comprise one or more properties. Each worker may be configured to perform a subset of the simulation and instantiate a subset of the plurality of entities. Each worker may be further configured to update the one or more properties of at least one component of the one or more components of each entity in the subset of the plurality of entities instantiated by the worker of the plurality of workers.

The spatial simulation runtime may comprise a state synchronization module (e.g., the state synchronizer 1010), an authority assignment module (e.g., the authority assignment 1020), an interest management module (e.g., the interest management 1030), a subscription matching module (e.g., the subscription matching 1040), and/or a view synchronization module (e.g., the view synchronization 1050). Each of the modules may be run in parallel and based on a same-tick processing architecture. Each of the above modules may be a software module implementing simulation functionality. The functionality may include any simulated process, device, or entity that may interact with its surroundings within the virtual space. The functionality may include real-time and/or real-world behavior from real-world equivalents of the simulated entities. The steps described in FIG. 11 may be performed in the same tick.

At step 1102, one or more changes associated with one of a plurality of entities may be received. For example, the entity changes may be received by the state synchronization module of the spatial simulation runtime from one or more workers. The entity changes may comprise entity creation (e.g., the entity creation 910), entity deletion (e.g., the entity deletion 920), and/or component updates (e.g., the component update 930).

At step 1104, one or more component updates associated with the one of the plurality of entities may be determined. For example, component updates (e.g., one or more updates of an entity's EntityAcl or position component) may be determined based on the entity changes. The state synchronization module of the spatial simulation runtime may determine whether the worker has the authority to perform each of the entity changes. If the state synchronization module determines that the worker has the authority to perform the entity changes, the state synchronization module may determine and output the component updates. Details of the determination of the component updates have been described in connection with FIGS. 9A, 9B, and 10.

At step 1106, the spatial simulation runtime may determine that one or more authority change events occurred. For example, the authority assignment module of the spatial simulation runtime may determine, based on the one or more changes and the one or more component updates, that one or more authority change events occurred on one or more components of the one of the plurality of entities. Details of the determination of the authority change events have been described in connection with FIGS. 9A, 9B, and 10.

At step 1108, the spatial simulation runtime may determine that one or more interest query change events occurred. For example, the interest management module of the spatial simulation runtime may determine, based on the one or more changes, the one or more component updates, and the one or more authority change events, that one or more interest query change events occurred. Details of the determination of the interest query change events have been described in connection with FIGS. 9A, 9B, and 10.

At step 1110, the spatial simulation runtime may determine that one or more interest view change events occurred. For example, the subscription matching module of the spatial simulation runtime may determine, based on the one or more changes, the one or more component updates, and the one or more interest query change events, that one or more interest view change events occurred. Details of the determination of the interest query change events have been described in connection with FIGS. 9A, 9B, and 10.

At step 1112, one or more worker protocol operations may be determined. For example, the view synchronization module of the spatial simulation runtime may determine, based on the one or more component updates, the one or more authority change events, and the one or more interest view change events, one or more worker protocol operations. Details of the determination of the worker protocol operations have been described in connection with FIGS. 9A, 9B, and 10.

At step 1114, the one or more changes may be synchronized with one or more interested workers of a plurality of worker. For example, the view synchronization module of the spatial simulation runtime may determine a worker view delta to synchronize all changes that occurred in the tick. The view synchronizer 1050 may generate worker protocol operations and send the worker protocol operations to the corresponding workers. Details of the synchronizing the changes have been described in connection with FIGS. 9A, 9B and 10.

As discussed above, QBI may allow users to write flexible queries that define which entities a worker should or desire to see. For example, QBI may specify the component data a worker has an interest in for the purpose of updating the components it has authority over. But these queries may form complicated trees of conjunctions and disjunctions. In general, a spatial simulation runtime may need to efficiently match: (a) a given query constraint to the set of entities in the world which match the query constraint, and (b) a given entity to the set of query constraints in the world which match the entity. There is a need to effectively match changing entities and worker interest queries in order to update a routing table (e.g., the interest state 1080) according to the QBI.

There might be two data structures: an entity index (e.g., an entity database) that stores entities and may be asked efficiently which entities match a given query, a query index that stores queries and may be asked efficiently which queries match a given entity. When an entity or query changes, the respective indices may be updated. The following describes how to efficiently determine the entity index and the query index.

Broad phase indexing techniques support different types of constraints and provide an efficient way of matching changing entities and complex worker interest queries. Because explicitly matching a given entity against a given query constraint may be an expensive operation, the broad phase indexing techniques may reduce the number of explicit match evaluations.

Figure 12:
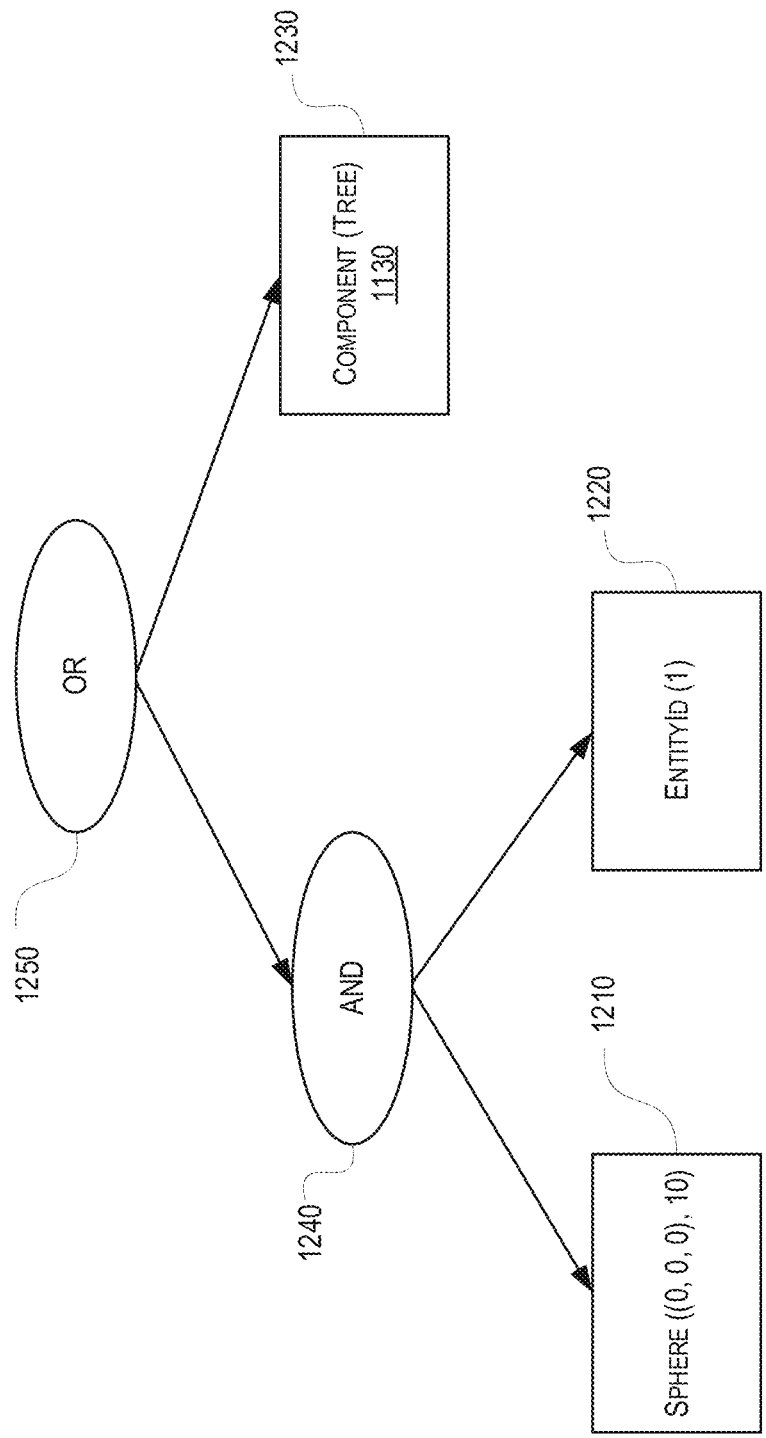
FIG. 12 illustrates an example tree structure of a query constraint that may be used in accordance with one or more illustrative aspects described herein.

FIG. 12 describes an example of a QBI query constraint. QBI constraints may define which entities the query matches. Broad phase indexing may split the types of QBI constraints into two categories-leaf sub-constraints and compound sub-constraints. Leaf sub-constraints may be "primitive" QBI constraints, which do not themselves contain any additional constraints. Conversely, compound sub-constraints may comprise more than one leaf sub-constraint. As shown in FIG. 12, nodes in a tree may represent compound sub-constraints, and leaves (e.g., leaf nodes, end nodes) in the tree may represent leaf sub-constraints. In this way, QBI constraints may be represented in the form of a tree. For example, a first leaf sub-constraint 1210 that comprises Sphere ((0, 0, 0), 10) may indicate a constraint—"match all entities within 10 meters of the origin." A second leaf sub-constraint 1120 that comprises EntityId(1) may indicate a constraint-"match all entities with EntityId(1)." An EntityId may uniquely identify one entity in the world or in a snapshot (e.g., a representation of the state of the world at a given point in time). A third leaf sub-constraint 1130 that comprises Component (tree) may indicate a constraint-"match all entities which have the Tree component."

Compound sub-constraints may be conjunctions or disjunctions of other constraints such as leaf sub-constraints and/or other compound constraints. For example, a node 1240 may indicate an "AND" constraint that combines the first leaf sub-constraint 1210 and the second leaf sub-constraint 1220. A node 1250 may indicate an "OR" constraint that comprises either the third leaf sub-constraint 1230 or the "AND" constraint indicated by the node 1240.

In order to match a given query constraint (e.g., "Q") to a set of entities in the world, the broad phase indexing splits the task into two phases—a broad phase and a narrow phase. In the broad phase, a computing device (e.g., the subscription matcher 1040) may determine (e.g., find) a set of candidate entities (e.g., "C") that could match the query constraint Q. The formula below shows the determination of the set of candidate entities that could match the query constraint.

$$\forall e.\text{matches}(Q,e) \Rightarrow e \in C$$

However, the above step performed in the broad phase may be an overapproximation to the set of entities that match the query constraint Q. The narrow phase may be performed to modify (e.g., narrow, limit) the set of candidate entities.

In the narrow phase, the subscription matcher 1040 may, for each candidate entity in the set of candidate entities C, explicitly evaluate the query constraint against the entity. The computing device may determine an entity that matches the query constraint Q if the entity passes the explicit match (e.g., the entity matches the query constraint Q). The computing device may remove entities from the set of candidate entities C if the entities do not pass the explicit match. Then, the set of candidate entities may be added or otherwise incorporated into the entity index.

The efficiency of this method may depend on finding a set of candidate entities as small as possible. One way of determining the set of candidate entities in the broad phase is to use all the entities in the world, which might not be efficient. A more efficient way to determine the set of candidate entities may be to define the candidate set as the union of all entities that match each leaf constraint in a given constraint. For example, the candidate entity set of the example constraint shown in FIG. 12 may be the union of: (a) all entities which match Sphere((0, 0, 0), 10), (b) all entities which match EntityId(1), and (c) all entities which match Component(Tree).

If a query constraint does not contain any AND constraint, the set of candidate entities may be the exact set of entities that matches the query constraint. In this case, the narrow phase may be skipped. However, if a query constraint contains one or more AND constraints, the set of candidate entities that match the union of all leaf constraints may be much larger than the actual set of entities that match the query constraint, which may lead to an expensive narrow phase.

However, if a query constraint contains one or more AND constraints, the set of candidate entities may be modified and may not need to match the union of all leaf constraints. For example, for each AND node, the computing device may prune (e.g., remove) all but one sub-constraint (e.g., a leaf constraint) out of the tree when determining the set of candidate entities because any entity that matches the AND constraint may necessarily match all sub-constraints. This may allow the computing device to prune one or more parts of the tree. The computing device may determine which sub-constraint may be kept. For example, the number of entities that match each sub-constraint may be estimated and a set of candidate entities with the smallest number of candidate entities may be determined. The estimation for the number of entities may be determined based on the leaf constraint type. For example, for component type constraints (e.g., constraints that are related to specific components), the number of entities that comprise a given component may be counted. In this case, the estimation of the number of entities that match the constraint may be the exact value of the number of entities that match the constraint. For entity Id type constraint, because only one entity at most may match such a constraint, a constant "1" may be determined for the number of entities that match such a constraint. For spatial type constraint (e.g., constraint related to a spatial location or distance based on, for example, sphere, cylinder, or box), the world may be divided into a coarse grid and the number of entities in each grid cell may be counted. To estimate the number of entities that match a spatial type constraint, the numbers of entities from all the overlapping grid cells that satisfy the constraint may be added. The determined number may be adjusted (e.g., reduced) based on the specific constraint content. This estimation method may be faster and more efficient than determining the true number of relevant entities, which may require the computing device to check individual entities and determine whether each of the entities actually lies in a specific box or not.

After estimating the number of entities that match each sub-constraint and determining a set of candidate entities with the smallest number of candidate entities, the sub-constraint that matches the determined set of candidate entities may be kept and the remaining sub-constraints associated with the AND node may be pruned. In some examples, any query containing a NOT constraint might not be pruned out under an AND constraint. Therefore, a candidate entity set of all entities in the world may have to be used.

Using the query constraint shown in FIG. 12 as an example, the computing device may prune either the Sphere ((0, 0, 0), 10) or the EntityId(1) constraint. If the computing device prunes the Sphere((0, 0, 0), 10) constraint, the set of candidate entities may become the union of all entities that match EntityId(1) and all entities that match Component (Tree). Therefore, the set of candidate entities may comprise a smaller number of candidate entities.

In the narrow phase, each candidate entity of the set of entities may be evaluated against a given query. This evaluation may be performed in a batch and a plurality of entities may be processed by single instruction multiple data (SIMD) registers at a time. For example, advanced vector extensions (e.g., Advanced Vector Extensions 2 (AVX2) intrinsics) may be used to batch a plurality of entities into bit registers and process the plurality of entities at a time. The data required to match any query against an entity may be loaded into some number of 32-bit values, and the matching logic may be evaluated using AVX2 instructions. Therefore, the computing device may batch 8 entities into 256-bit AVX2 registers and process 8 entities at a time.

For example, the computing device may load, for each candidate entity, (a) the lower 32 bits of the entity ID into a SIMD register, (b) the upper 32 bits of the entity ID into a SIMD register, (c) the x coordinate in float-precision into a SIMD register, (d) the y coordinate in float-precision into a SIMD register, (e) the z coordinate in float-precision into a SIMD register, (f) 32 bit bitset (e.g., a biset indicates if a given component with an associated bitset index is present on the entity) cells into a SIMD register. In this way, the computing device may process an arbitrary query constraint against 8 entities at a time using AVX2 instructions and the efficiency of performing the narrow phase may be improved.

In order to determine whether one or more query constraints match an entity, a similar approach to the above method of determining entities that match a given constraint may be taken. A set of candidate queries that could match the entity may be determined. Then each query in the set of candidate queries may be explicitly evaluated against the entity. Specifically, the set of candidate queries may be calculated by taking the union of all queries in the world which contain a leaf constraint that matches the entity. Each indexed query may have its AND constraints pruned in the same way as the entity index, with each of the non-pruned leaf constraints being indexed (e.g., add to the query index).

The above broad phase indexing methods may have the following advantages. First, the determination of the set of candidate entities or queries may be independent of the types of leaf constraints. Thus it may be simple to add a new type of leaf constraint to the tree. Second, the spatial simulation runtime may not need to evaluate each of the entities or queries in the world for matching changing queries or entities. Third, explicit matching for queries that do not contain AND constraints may not be required. Fourth, because the above broad phase indexing methods operate on leaf constraints, users may be able to express arbitrarily complex queries that can benefit from indexing without any specific tweaking, which may limit large latency spikes while evaluating them. Fifth, individual specialized leaf index implementations such as a multi-dimensional indexing and storage structure tree (e.g., a PH tree) may be integrated easily without processing the complex interest query languages. Sixth, modern SIMD CPU instruction sets may be used to match entities or queries in bulk.

Figure 13:
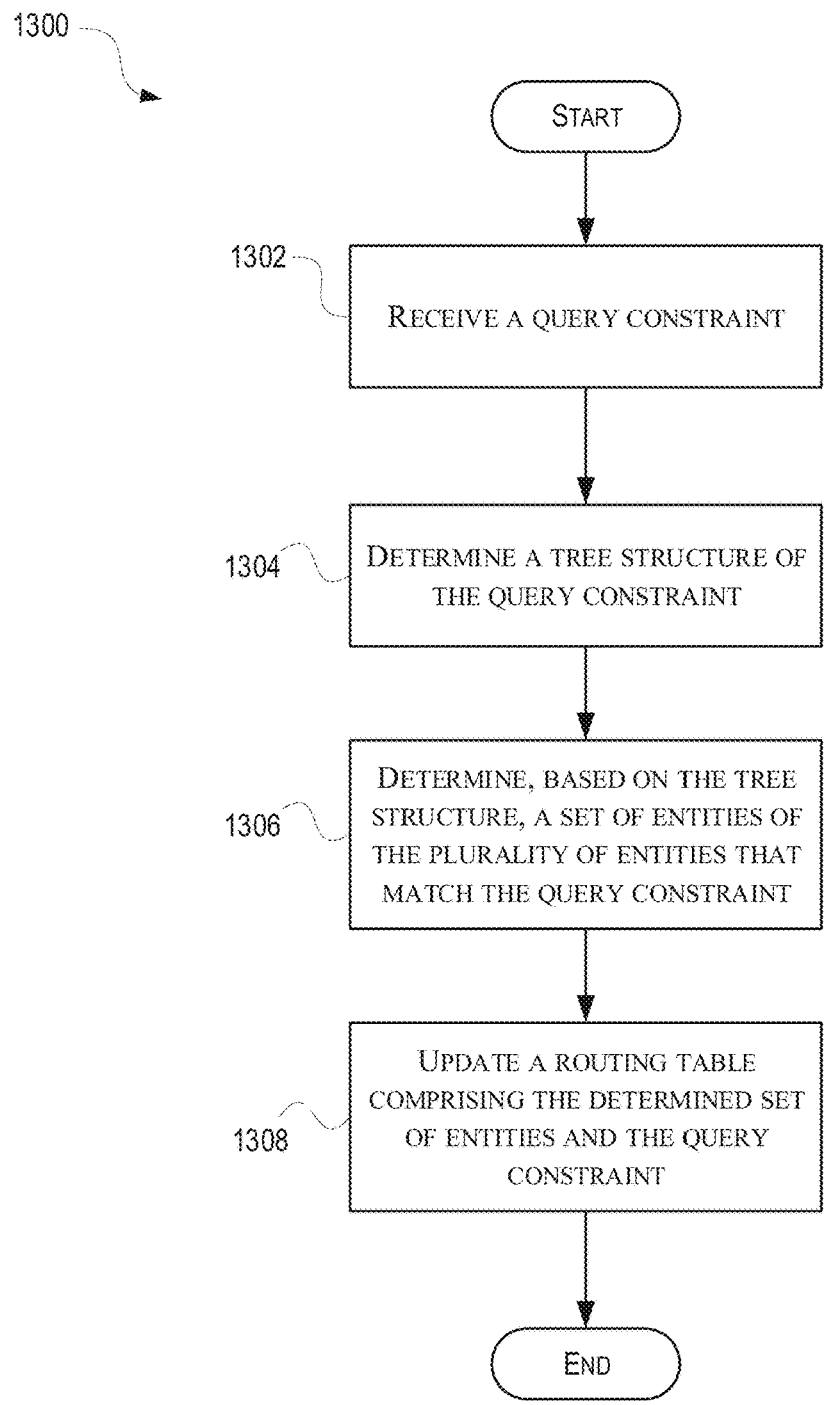
FIG. 13 illustrates a flow chart of an example method for matching entities to a query constraint that may be used in accordance with one or more illustrative aspects described herein.

FIG. 13 illustrates a flow chart of an example method for matching entities to a query constraint. A similar method may be performed for matching query constraints to an entity.

At 1302, a computing device (e.g., the subscription matcher 1040) may receive a query. The query may be an interest query sent from a worker that specifies the component data the worker has an interest in for the purpose of updating the components it has authority over. The query may comprise one or more constraints that comprise one or more limitations associated with a plurality of entities being simulated. For example, the constraints may indicate what entities the query matches.

At 1304, the computing device may determine a tree structure of a constraint of the query. The constraint may be divided into two types of sub-constraints, compound sub-constraints and leaf sub-constraints. The constraint may be represented based on the tree structure. For example, as shown in FIG. 12, nodes in a tree may represent compound sub-constraints, and leaves (e.g., leaf nodes, end nodes) in the tree may represent leaf sub-constraints. The tree structure is not limited to the example shown in FIG. 12 and other types of tree structure may be used.

At 1306, the computing device may determine, based on the tree structure, a set of entities of a plurality of entities (e.g., all the entities in the world) that match the query constraint. For example, the computing device may determine the set of entities based on whether an entity of the plurality of entities matches one of the leaf sub-constraints. If a constraint comprises one or more compound sub-constraints that indicate a combination of leaf sub-constraints (e.g., AND node), the subscription matcher 1040 may, for each compound sub-constraint, prune (e.g., remove) at least one (e.g., all but one) sub-constraint (e.g., a leaf constraint) out of the tree when determining the set of entities.

At 1308, the computing device may update a routing table (e.g., the interest state 1080) to comprise the determined set of entities and the query constraint. The computing device may store a routing table comprising the entity index and the query index according to the received query. The routing table may comprise information indicating a relationship between the entities and the worker interest queries. The routing table may be constantly updated based on receiving a new worker interest query or a new entity change. The computing device may update the routing table to comprise the determined set of entities and the query constraint. The updating of the routing table may be performed in a later stage of a tick (e.g., a third tick stage) after other information (e.g., authority information, interest information) has been determined and fanned out to interested workers.

Whilst the embodiments and aspects have been described in relation to virtual hardware servers, the methods and systems may also be used with other hardware or servers including local or physical servers.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A simulation system comprising:
at least one computer processor controlling some operations of the system; and
memory storing computer-readable instructions that, when executed by the at least one computer processor, configure the system to run a simulation of a world comprising:
  a plurality of entities being simulated in the simulation of the world at a spatial simulation runtime tick rate, wherein each entity of the plurality of entities comprises one or more components;
  a plurality of worker modules, wherein each of the plurality of worker modules is configured to perform a subset of the simulation, and to instantiate a subset of the plurality of entities in the simulation of the world, and wherein each of the plurality of worker modules operates on a worker tick rate slower than the spatial simulation runtime tick rate;
  a state synchronization module configured to, within a first tick of the spatial simulation runtime tick rate;
    receive, from at least one of the plurality of worker modules and at the worker tick rate slower than the spatial simulation runtime tick rate, one or more changes associated with one of the plurality of entities, and
    determine, based on the one or more changes, one or more component updates associated with the one of the plurality of entities;
  an authority assignment module configured to:
    receive the one or more changes and the one or more component updates, and
    determine, based on the one or more changes and the one or more component updates, and based on cached authority information from a previous tick, before the first tick, of the spatial simulation runtime tick rate, that one or more authority change events occurred on one or more components of the one of the plurality of entities;
  an interest management module configured to, within the first tick:
    receive, one or more changes, the one or more component updates, and the one or more authority change events, and
    determine, based on the one or more changes, the one or more component updates, the one or more authority change events, and cached interest information from the previous tick of the spatial simulation runtime tick rate, that one or more interest query change events occurred;
  a subscription matching module configured to, within the first tick:
    receive, the one or more changes, the one or more component updates, and the one or more interest query change events, and
    determine, based on the one or more changes, the one or more component updates, and the one or more interest query change events, that one or more interest view change events occurred; and a view synchronization module configured to, within the first tick:
  receive, the one or more component updates, the one or more authority change events, and the one or more interest view change events, and
  determine, based on the one or more component updates, the one or more authority change events, and the one or more interest view change events, one or more worker protocol operations to synchronize view changes in the simulation of the world with one or more interested worker modules of the plurality of worker modules,
wherein the state synchronization module is further configured to:
  based on a determination that the one or more changes are authorized to be made by one or more corresponding worker modules of the plurality of worker modules, cause one or more additional workers of the plurality of worker modules to implement the one or more changes at the worker tick rate slower than the spatial simulation runtime tick rate.

2. The system of claim 1, wherein the state synchronization module is further configured to determine whether the one or more changes are authorized to be made by one or more corresponding worker modules of the plurality of worker modules.

3. The system of claim 1, wherein the state synchronization module is further configured to generate the cached authority information during the previous tick before the first tick by caching authority information received during the previous tick.

4. The system of claim 1, wherein the view synchronization module is further configured to send the one or more worker protocol operations to the one or more interested worker modules of the plurality of worker modules.

5. The system of claim 1, wherein the one or more authority change events comprise one or more of creation of the one of the plurality of entities, deletion of the one of the plurality of entities, or an update of the one or more components of the one of the plurality of entities.

6. The system of claim 1, wherein the one or more interest query change events comprise one or more of a position change to the one of the plurality of entities, an interest change to the one of the plurality of entities, or an authority change to the one of the plurality of entities.

7. The system of claim 1, wherein both the first tick and the previous tick comprise a different iteration of a main or primary process thread associated with the at least one computer processor, and wherein the worker tick rate comprises a tick rate of a main or primary process thread associated with one or more different computer processors executing the plurality of worker modules.

8. A computing device comprising:
at least one computer processor; and
memory storing computer-readable instructions that, when executed by the at least one computer processor, cause the computing device to, within a tick:
  receive, during a first tick of a spatial simulation runtime tick rate, and from at least one of a plurality of workers operating at a worker tick rate slower than the spatial simulation runtime tick rate, one or more changes associated with one of a plurality of entities being simulated in a simulation of a world at the spatial simulation runtime tick rate, wherein each entity of the plurality of entities comprises one or more components;
  determine, during the first tick, based on the one or more changes, one or more component updates associated with the one of the plurality of entities;
  determine, during the first tick, based on the one or more changes and the one or more component updates, and based on cached authority information from a previous tick, before the first tick, of the spatial simulation runtime tick rate, that one or more authority change events occurred on one or more components of the one of the plurality of entities;
  determine, during the first tick, based on the one or more changes, the one or more component updates, the one or more authority change events, and cached interest information from the previous tick of the spatial simulation runtime tick rate, that one or more interest query change events occurred;
  determine, based on the one or more changes, the one or more component updates, and the one or more interest query change events, that one or more interest view change events occurred;
  determine, based on the one or more component updates, the one or more authority change events, and the one or more interest view change events, one or more worker protocol operations; and
  synchronize, based on the one or more worker protocol operations, view changes in the simulation of the world with one or more interested workers of the plurality of workers, wherein each of the plurality of workers is configured to instantiate a subset of the plurality of entities, and wherein each of the plurality of workers operates on the worker tick rate slower than the spatial simulation runtime tick rate; and
  based on a determination that the one or more changes are authorized to be made by one or more corresponding workers of the plurality of workers, cause one or more additional workers of the plurality of workers to implement the one or more changes at the worker tick rate slower than the spatial simulation runtime tick rate.

9. The computing device of claim 8, wherein the instructions that, when executed by the at least one computer processor, further cause the computing device to
  determine whether the one or more changes are authorized to be made by one or more corresponding worker of the plurality of workers.

10. The computing device of claim 8, wherein the instructions that, when executed by the at least one computer processor, further cause the computing device to;
  generate the cached authority information during the previous tick before the first tick by caching authority information received during the previous tick.

11. The computing device of claim 8, wherein the one or more authority change events comprise one or more of creation of the one of the plurality of entities, deletion of the one of the plurality of entities, or an update of the one or more components of the one of the plurality of entities.

12. The computing device of claim 8, wherein the one or more interest query change events comprise one or more of a position change to the one of the plurality of entities, an interest change to the one of the plurality of entities, or an authority change to the one of the plurality of entities.

13. The computing device of claim 8, wherein the first tick and the previous tick comprise a different iteration of a main or primary process thread associated with the at least one computer processor, and wherein the worker tick rate comprises a tick rate of a main or primary process thread associated with one or more different computer processors executing the plurality of workers.

14. A method comprising:
receiving, by a computing device, within a first tick of a spatial simulation runtime tick rate, and from at least one of a plurality of workers operating at a worker tick rate slower than the spatial simulation runtime tick rate, one or more changes associated with one of a plurality of entities being simulated in a simulation of a world at the spatial simulation runtime tick rate, wherein each entity of the plurality of entities comprises one or more components;
determining, based on the one or more changes and within the first tick, one or more component updates associated with the one of the plurality of entities;
determining, based on the one or more changes and the one or more component updates and within the first tick, and based on cached authority information from a previous tick, before the first tick, of the spatial simulation runtime tick rate, that one or more authority change events occurred on one or more components of the one of the plurality of entities;
determining, based on the one or more changes and within the first tick, the one or more component updates, the one or more authority change events, and cached interest information from the previous tick of the spatial simulation runtime tick rate, that one or more interest query change events occurred;
determining, based on the one or more changes and within the first tick, the one or more component updates, and the one or more interest query change events, that one or more interest view change events occurred;
determining, based on the one or more component updates and within the first tick, the one or more authority change events, and the one or more interest view change events, one or more worker protocol operations; and
synchronizing, based on the one or more worker protocol operations and within the first tick, view changes in the simulation of the world with one or more interested workers of a plurality of workers, wherein each of the plurality of workers is configured to instantiate a subset of the plurality of entities, and wherein each of the plurality of workers operates on the worker tick rate slower than the spatial simulation runtime tick rate; and
based on a determination that the one or more changes are authorized to be made by one or more corresponding workers of the plurality of workers, cause one or more additional workers of the plurality of workers to implement the one or more changes at the worker tick rate slower than the spatial simulation runtime tick rate.

15. The method of claim 14, further comprising:
determining whether the one or more changes are authorized to be made by one or more corresponding worker of the plurality of workers.

16. The method of claim 14, further comprising:
generating the cached authority information during the previous tick before the first tick by caching authority information received during the previous tick.

17. The method of claim 14, wherein the one or more authority change events comprise one or more of creation of the one of the plurality of entities, deletion of the one of the plurality of entities, or an update of the one or more components of the one of the plurality of entities.

18. The method of claim 14, wherein the interest query change events comprise one or more of a position change to the one of the plurality of entities, an interest change to the one of the plurality of entities, or an authority change to the one of the plurality of entities.

19. The method of claim 14, further comprising:
sending the one or more worker protocol operations to the one or more interested workers.

20. The method of claim 14, wherein the first tick and the previous tick comprise a different iteration of a main or primary process thread associated with the computing device, and wherein the worker tick rate comprises a tick rate of a main or primary process thread associated with one or more different computer processors executing the plurality of workers.

* * * * *